US012713236B2

(12) United States Patent
Kim et al.

(10) Patent No.: US 12,713,236 B2
(45) Date of Patent: Aug. 18, 2026

(54) METHOD AND DEVICE FOR OPERATING TERMINAL IN WIRELESS COMMUNICATION SYSTEM

(71) Applicant: LG ELECTRONICS INC., Seoul (KR)

(72) Inventors: Dongjoo Kim, Seoul (KR); Hyun Sook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 421 days.

(21) Appl. No.: 18/571,609

(22) PCT Filed: Jan. 24, 2022

(86) PCT No.: PCT/KR2022/001228
§ 371 (c)(1),
(2) Date: Dec. 18, 2023

(87) PCT Pub. No.: WO2023/003113
PCT Pub. Date: Jan. 26, 2023

(65) Prior Publication Data
US 2024/0292219 A1 Aug. 29, 2024

(30) Foreign Application Priority Data
Jul. 22, 2021 (KR) ........................ 10-2021-0096542

(51) Int. Cl.
*H04M 3/16* (2006.01)
*H04W 12/069* (2021.01)
*H04W 12/084* (2021.01)

(52) U.S. Cl.
CPC ....... *H04W 12/069* (2021.01); *H04W 12/084* (2021.01)

(58) Field of Classification Search
CPC . H04W 12/069; H04W 12/084; H04W 8/183; H04W 60/04; H04W 12/037;
(Continued)

(56) References Cited

U.S. PATENT DOCUMENTS 11,395,127 B2 * 7/2022 Sahin .................. H04L 65/1069
11,470,474 B2 * 10/2022 Palanigounder ...... H04W 12/06
(Continued)

FOREIGN PATENT DOCUMENTS

WO 2021-134107 7/2021

OTHER PUBLICATIONS

PCT International Application No. PCT/KR2022/001228, International Search Report dated Apr. 26, 2022, 4 pages.
(Continued)

*Primary Examiner* — Amancio Gonzalez
(74) *Attorney, Agent, or Firm* — LEE, HONG, DEGERMAN, KANG & WAIMEY

(57) ABSTRACT

Disclosed herein is a method for operating a user equipment (UE) in a wireless communication system, and the method may include generating, by the UE, a SUCI by encrypting a unique identifier with a public key of a DCS, transmitting, to a base station, a registration request including the generated SUCI and a first standalone non public network (SNPN) ID, performing two-way authentication with the base station, receiving, from the base station, a provisioning server address and a provisioning server token based on the two-way authentication being completed, transmitting, to a provisioning server, a credential request including the unique identifier and the provisioning server token based on the received provisioning server address, and being provided with a credential of a first SNPN from the provisioning server.

12 Claims, 16 Drawing Sheets

(58) Field of Classification Search
CPC .. H04W 12/35; H04W 12/72; H04L 2209/80; H04L 9/3263; H04L 9/3273; H04L 9/3213
USPC .......................................................... 455/411
See application file for complete search history.

(56) References Cited

U.S. PATENT DOCUMENTS

| | | | | |
|---|---|---|---|---|
| 11,659,387 | B2 * | 5/2023 | Nair | H04W 12/06 455/411 |
| 11,785,450 | B2 * | 10/2023 | Tiwari | H04W 48/18 455/411 |
| 11,785,456 | B2 * | 10/2023 | Gundavelli | H04W 12/40 726/7 |
| 12,356,199 | B2 * | 7/2025 | Lei | H04W 12/75 |
| 12,477,329 | B2 * | 11/2025 | Hu | H04W 12/069 |
| 2020/0245235 | A1 * | 7/2020 | Chun | H04W 48/18 |
| 2021/0058784 | A1 * | 2/2021 | Kedalagudde | H04W 76/12 |
| 2021/0105712 | A1 * | 4/2021 | Speicher | H04W 60/04 |
| 2022/0174583 | A1 * | 6/2022 | Yang | H04W 48/16 |
| 2023/0164559 | A1 * | 5/2023 | Yang | H04L 9/0822 455/411 |
| 2023/0179989 | A1 * | 6/2023 | Nayak | H04L 41/0806 455/558 |

OTHER PUBLICATIONS

Intel et al., "KI #4, Evaluation —UE Onboarding," S2-2007854, 3GPP TSG-WG SA2 Meeting #141e, e-meeting, Oct. 2020, 7 pages.
Intel, "Updates to solution 14: Removal of Editor's notes and Evaluation," S3-210985, 3GPP TSG-SA3 Meeting #102Bis-e, e-meeting, Mar. 2021, 8 pages.
Huawei et al., "KI#4, evaluations and conclusions updates," S2-2009151, 3GPP TSG-WG SA2 Meeting #142e, Nov. 2020, 10 pages.
Ericsson, "KI#4, New Sol: Simplified Onboarding procedure supporting both User and Control Plane UE Provisioning Procedures," S2-2003610, 3GPP TSG-WG SA2 Meeting #139e, Jun. 2020, 10 pages.
European Patent Office Application Serial No. 22845985.5, Search Report dated Jun. 5, 2025, 9 pages.
3rd Generation Partnership Project, "Technical Specification Group Services and System Aspects; Study on enhanced support of non-public networks (Release 17)," 3GPP TR 23.700-07 V1.2.0, Nov. 2020, 247 pages.

* cited by examiner

Device(1000)

Communication unit(1010)
(e.g.,5G Communication unit)

Communication circuit(1012)
(e.g.,processor(s),Memory(s))

Transceiver(s)(1014)
(e.g.,RF unit(s),antenna(s))

Control unit(1020)
(e.g.,processor(s))

Memory unit(1030)
(e.g.,RAM,storage)

Additional components(1040)
(e.g.,power unit/battery, I/O unit, driving unit, computing unit)

METHOD AND DEVICE FOR OPERATING TERMINAL IN WIRELESS COMMUNICATION SYSTEM

CROSS-REFERENCE TO RELATED APPLICATIONS

This application is the National Stage filing under 35 U.S.C. 371 of International Application No. PCT/KR2022/001228, filed on Jan. 24, 2022, which claims the benefit of earlier filing date and right of priority to Korean Application No. 10-2021-0096542, filed on Jul. 22, 2021, the contents of which are all hereby incorporated by reference herein in their entireties.

TECHNICAL FIELD

The present disclosure relates to a wireless communication system, and more particularly, to a method and apparatus for operating a user equipment. Specifically, the present disclosure relates to a method for being dynamically allocated a credential of a standalone NPN (SNPN) that a user equipment (UE) wants to access.

BACKGROUND

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

In particular, as a large number of communication devices require a large communication capacity, the enhanced mobile broadband (eMBB) communication technology, as compared to the conventional radio access technology (RAT), is being proposed. In addition, not only massive machine type communications (massive MTC), which provide a variety of services anytime and anywhere by connecting multiple devices and objects, but also a communication system considering a service/user equipment (UE) sensitive to reliability and latency is being proposed. Various technical configurations for this are being proposed.

SUMMARY

The present disclosure may provide a method and device for operating a UE in a wireless communication system.

The present disclosure may provide a method and device for being dynamically allocated a credential of an SNPN which a UE wants to access in a wireless communication system.

The present disclosure may provide a method and device for performing two-way authentication with an onboarding network by a UE in a wireless communication system.

The present disclosure may provide a method and device for performing two-way authentication without supporting a proxy function to an onboarding network, when a UE performs two-way authentication with an onboarding SNPN (O-SNPN) in a wireless communication system.

The present disclosure may provide a method and device for performing two-way authentication by a UE performing two-way authentication with an onboarding SNPN (O-SNPN), even when a default credential server (DCS) recognizes a 5GS and thus does not support an AUSF and a UDM function.

The technical objects to be achieved in the present disclosure are not limited to the above-mentioned technical objects, and other technical objects that are not mentioned may be considered by those skilled in the art through the embodiments described below.

As an example of the present disclosure, a method for operating a terminal in a wireless communication system may comprise: generating, by the UE, a subscription concealed identifier (SUCI) by encrypting a unique identifier with a public key of a default credential server (DCS), transmitting, to a base station, a registration request including the generated SUCI and a first standalone non public network (SNPN) ID, performing two-way authentication with the base station, receiving, from the base station, a provisioning server address (PS_address) and a provisioning server token (PS_token) based on the two-way authentication being completed, transmitting, to a provisioning server, a credential request including the unique identifier and the PS_token to a provisioning server based on the received PS_address, and being provided with a credential of a first SNPN from the provisioning server.

Also, as an example of the present disclosure, a user equipment (UE) operating in a wireless communication system may comprise: at least one transceiver, at least one processor, and at least one memory coupled operably with the at least one processor and storing instructions enabling, when executed, the at least one processor to perform a specific operation, wherein the specific operation comprises: generating a subscription concealed identifier (SUCI) by encrypting a unique identifier with a public key of a default credential server (DCS), controlling the transceiver to transmit, to a base station, a registration request including the generated SUCI and a first standalone non public network (SNPN) ID, performing two-way authentication with the base station, controlling the transceiver to receive, from the base station, a provisioning server address (PS_address) and a provisioning server token (PS_token) based on the two-way authentication being completed, controlling the transceiver to transmit, to the provisioning server, a credential request including the unique identifier and the PS_token based on the received PS_address, and controlling the transceiver to be provided with a credential of a first SNPN from the provisioning server.

Also, as an example of the present disclosure, a method for operating a base station in a wireless communication system may comprise: receiving, from a user equipment (UE), a registration request including an SUCI and a first SNPN ID, Transmitting, to a DCS, an authentication information request based on the received registration request, receiving, based on the authentication information request, a response including at least one of a first certificate, an address of a provisioning server (PS_address), and a provisioning server token (PS_token), performing two-way authentication with the UE based on the received response, and transmitting the PS_address and the PS_token to the UE based on the two-way authentication being completed, wherein the UE transmits, to a provisioning server, a credential request including the unique identifier and the PS_token based on the received PS_address and is provided with a credential of a first SNPN from the provisioning server.

Also, as an example of the present disclosure, a base station operating in a wireless communication system may comprise: at least one transceiver, at least one processor, and at least one memory coupled operably with the at least one processor and storing instructions enabling, when executed, at least one processor to perform a specific operation, wherein the specific operation comprises: controlling the transceiver to receive, from a user equipment (UE), a registration request including an SUCI and a first SNPN ID, controlling the transceiver to transmit, to a DCS, an authentication information request based on the received registration request, controlling the transceiver to receive, based on the authentication information request, a response including at least one of a first certificate, an address of a provisioning server (PS_address), and a provisioning server token (PS-_token), performing two-way authentication with the UE based on the received response, and controlling the transceiver to transmitting the PS_address and the PS_token to the UE based on the two-way authentication being completed, and wherein the UE transmits, to the provisioning server, a credential request including the unique identifier and the PS_token based on the received PS_address and is provided with a credential of a first SNPN from the provisioning server.

Also, as an example of the present disclosure, a device may comprise at least one memory and at least one process functionally coupled with the at least one memory, wherein the at least one process controls the device to: generate a subscription concealed identifier (SUCI) by encrypting a unique identifier with a public key of a default credential server (DCS), transmit, to a base station, a registration request including the generated SUCI and a first standalone non public network (SNPN) ID, perform two-way authentication with the base station, receive, from the base station, a provisioning server address (PS_address) and a provisioning server token (PS_token) based on the two-way authentication being completed, transmit, to a provisioning server, a credential request including the unique identifier and the PS_token based on the received PS_address, and be provided with a credential of a first SNPN from the provisioning server.

Also, as an example of the present disclosure, a non-transitory computer-readable medium storing at least one instruction may comprise the at least one instruction executable by a processor, wherein the at least one instruction is configured to: generate a subscription concealed identifier (SUCI) by encrypting a unique identifier with a public key of a default credential server (DCS), transmit, to a base station, a registration request including the generated SUCI and a first standalone non public network (SNPN) ID, perform two-way authentication with the base station, receive, from the base station, information on a provisioning server address (PS_address) and a provisioning server token (PS_token) based on the two-way authentication being completed, transmit, to a provisioning server, a credential request including the unique identifier and the PS_token based on the received PS_address, and be provided with a credential of a first SNPN from the provisioning server.

In addition, the following points can be applied in common

Also, as an example of the present disclosure, an access and mobility management function (AMF) of the base station may receive the registration request from the UE, and wherein the AMF may request authentication including the SUCI and the first SNPN ID to an authentication server function (AUSF) of the base station.

Also, as an example of the present disclosure, based on the AMF requesting the authentication to the AUSF, the AMF may further transmit, to the AUSF, authentication method selection indication information.

Also, as an example of the present disclosure, wherein the AUSF searches for the DCS by confirming the authentication method selection indication information and domain information of the SUCI and requests necessary information for the authentication of the UE to the DCS.

Also, as an example of the present disclosure, the necessary information for the authentication of the UE transmitted to the DCS may include the SUCI, wherein the DCS generates a subscriber identifier (SUPI) by decrypting the SUCI with private key, generate a first certificate capable of verifying a certificate mapped to the SUPI, generate the PS_address of the provisioning server in charge of authenticating the first SNPN based on the first SNPN ID, and generate the PS_token that the provisioning server and the UE use for authentication.

Also, as an example of the present disclosure, the AUSF may receive from the DCS, the first certificate, the PS_address of the provisioning server in charge of authenticating the first SNPN based on the first SNPN ID, and the PS_token that the provisioning server uses for the authentication of the UE.

Also, as an example of the present disclosure, the UE may be provided beforehand by the DSC with at least one of the unique identifier, the public key, a certificate of the UE issued based on the DCS, and a certificate of a root/intermediary certificate authority (CA) capable of verifying a certificate of a base station.

Also, as an example of the present disclosure, the two-way authentication may be performed based on an extensible authentication protocol-transport layer security (EAP-TLS) protocol.

Also, as an example of the present disclosure, the base station may be an onboarding-standalone non-public network (O-SNPN).

Also, as an example of the present disclosure, the UE may access the first SNPN based on the credential of the first SNPN delivered from the provisioning server.

The present disclosure can provide a method for operating a UE in a wireless communication system.

The present disclosure can provide a method for being dynamically allocated a credential of an SNPN which a UE wants to access in a wireless communication system.

The present disclosure can provide a method for performing two-way authentication with an onboarding network by a UE in a wireless communication system.

The present disclosure can enable a UE to perform two-way authentication without supporting a proxy function to an onboarding network, when performing two-way authentication with an onboarding SNPN (O-SNPN) in a wireless communication system.

The present disclosure can enable a UE to perform two-way authentication when performing two-way authentication with an onboarding SNPN (O-SNPN), even if a default credential server (DCS) recognizes a 5GS and thus does not support an AUSF and a UDM function.

Effects obtained in the present disclosure are not limited to the above-mentioned effects, and other effects not mentioned above may be clearly derived and understood by those skilled in the art, to which a technical configuration of the present disclosure is applied, from the following description of embodiments of the present disclosure. That is, effects, which are not intended when implementing a configuration described in the present disclosure, may also be derived by those skilled in the art from the embodiments of the present disclosure.

BRIEF DESCRIPTION OF THE DRAWINGS

The accompanying drawings are provided to aid understanding of the present disclosure, and embodiments of the present disclosure may be provided together with a detailed description. However, the technical features of the present disclosure are not limited to a specific drawing, and features disclosed in each drawing may be combined with each other to constitute a new embodiment. Reference numerals in each drawing may mean structural elements.

DETAILED DESCRIPTION

Figure 1:
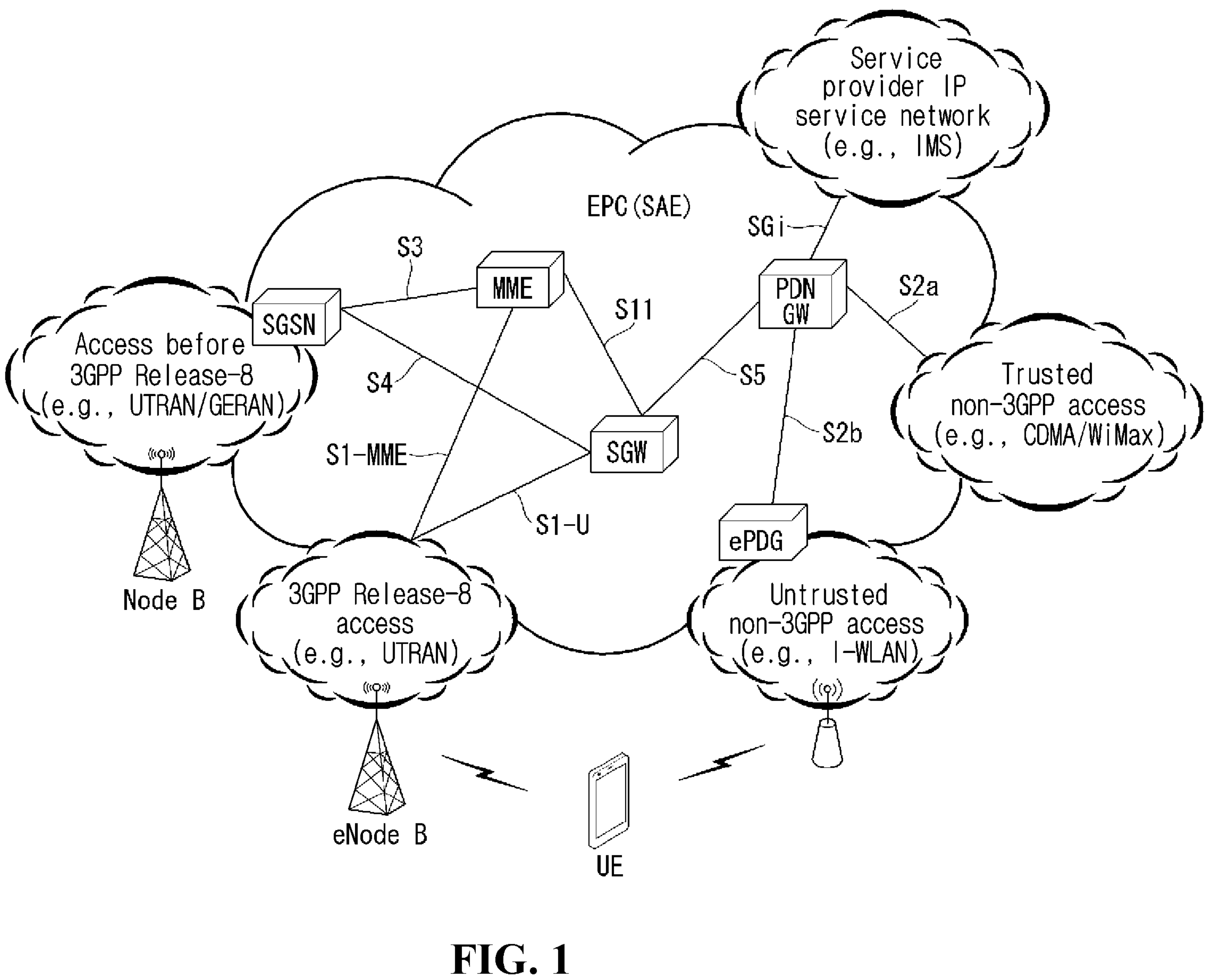
FIG. 1 is a view illustrating various reference points.

Following embodiments are achieved by combination of structural elements and features of the present disclosure in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment.

In the description of the drawings, procedures or steps which render the scope of the present disclosure unnecessarily ambiguous will be omitted and procedures or steps which can be understood by those skilled in the art will be omitted.

In the entire specification, when a certain portion "comprises" or "includes" a certain component, this indicates that the other components are not excluded, but may be further included unless specially described. The terms "unit", "-or/er" and "module" described in the specification indicate a unit for processing at least one function or operation, which may be implemented by hardware, software and a combination thereof. In addition, "a or an", "one", "the" and similar related words may be used as the sense of including both a singular representation and a plural representation unless it is indicated in the context describing the present specification (especially in the context of the following claims) to be different from this specification or is clearly contradicted by the context.

In this specification, the embodiments of the present disclosure are described with focus on the relationship of data reception and transmission between a base station and a mobile station. Herein, the base station means a terminal node of a network that performs direct communication with the mobile station. In this document, a specific operation, which is described to be performed by a base station, may be performed by an upper node of the base station in some cases.

That is, in a network consisting of a plurality of network nodes including a base station, various operations for communicating with a mobile station may be performed by the base station or network nodes other than the base station. Herein, "base station" may be replaced by such terms as "fixed station", "Node B", "eNode B(eNB)", "gNode B(gNB)", "ng-eNB", "advanced base station(ABS)", or "access point".

Also, in the embodiments of the present disclosure, "terminal" may be replaced by such terms as "user equipment (UE)", "mobile station(MS)", "subscriber station(SS)", "mobile subscriber station(MSS)", "mobile terminal" or "advanced mobile station(AMS)".

In addition, a transmission end refers to a fixed and/or mobile node that provides a data service or a voice service, and a reception end means a fixed and/or mobile node that receives a data service or a voice service. Accordingly, in the case of an uplink, a mobile station may be a transmission end, and a base station may be a reception end. Likewise, in the case of a downlink, a mobile station may be a reception end, and a base station may be a transmission end.

The embodiments of the present disclosure may be supported by standard documents disclosed in at least one of the following radio access systems: an IEEE 802 xx system, a 3rd generation partnership project (3GPP) system, a 3GPP long term evolution (LTE) system, a 3GPP 5th generation (5G) new radio (NR) system and a 3GPP2 system, and in particular, the embodiments of the present disclosure may be supported by the following documents: 3GPP TS (technical specification) 38.211, 3GPP TS 38.212, 3GPP TS 38.213, 3GPP TS 38.321, and 3GPP TS 38.331.

In addition, the embodiments of the present disclosure are applicable to another radio access system but is not limited to the above-described system. As an example, they are applicable to a system applied after a 3GPP 5G NR system and are not limited to a specific system.

That is, obvious steps and parts not described in the embodiments of the present disclosure may be described with reference to the above documents. In addition, all the terms disclosed in this document may be explained by the standard document.

Hereinafter, a preferred embodiment according to the present disclosure will be described in detail with reference to accompanying drawings. Detailed descriptions disclosed below together with accompanying drawings are intended to describe example embodiments of the present disclosure and not intended to show any sole embodiment in which a technical configuration of the present disclosure can be implemented.

In addition, specific terms used in the embodiments of the present disclosure are provided to help understand the present disclosure, and such specific terms may be used in any other modified forms without departing from the technical idea of the present disclosure.

The following technology may be applied to various radio access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA) and the like.

For clarity of explanation, the descriptions below are based on a 3GPP communication system (e.g. LTE, NR and the like), but the technical idea of the present disclosure is not limited thereto. LTE may mean a technology after 3GPP TS 36.xxx Release 8. Specifically, the LTE technology after 3GPP TS 36.xxx Release 10 may be referred to as LTE-A, and the one after 3GPP TS 36.xxx Release 13 may be referred to as LTE-A pro. 3GPP NR may mean a technology after TS 38.xxx Release 15. 3GPP 6G may mean a technology after TS Release 17 and/or Release 18. "xxx" means the specific number of a standard document. LTE/NR/6G may be referred to collectively as 3GPP system.

Contents described in standard documents released earlier than the present disclosure may be referred to for the background art, terms and abbreviations used in the present disclosure. As an example, 36.xxx and 38.xxx standard documents may be referred to.

Terms used in the present disclosure are defined as follows.

IP Multimedia Subsystem or IP Multimedia Core Network Subsystem (IMS): an architectural framework for providing standardization for delivering voice or other multimedia services on internet protocol (IP).

Universal Mobile Telecommunication System (UMTS): the 3rd generation mobile communication technology based on global system for mobile communication (GSM) developed by the 3GPP.

Evolved Packet System (EPS): a network system consisting of an evolved packet core (EPC), that is an IP based packet switched core network, and an access network such as LTE and UTRAN. The EPS is a network of an evolved version of a universal mobile telecommunications system (UMTS).

NodeB: a base station of a UMTS network. It is installed outdoor, and its coverage has a scale of a macro cell.

eNodeB: a base station of an EPS network. It is installed outdoor, and its coverage has a scale of a macro cell.

Home NodeB: it is installed indoors as a base station of the UMTS network, and its coverage has a scale of a macro cell.

Home eNodeB: it is installed indoors as a base station of the EPS network, and its coverage has a scale of a macro cell.

User Equipment (UE): the UE can be called a terminal, a mobile equipment (ME), a mobile station (MS), etc. The UE can be a portable device such as a notebook computer, a cellular phone, a personal digital assistant (PDA), a smart phone, and a multimedia device, or a fixed device such as a personal computer (PC) and a vehicle-mounted device. The term of UE may refer to an MTC UE in the description related to MTC.

Machine Type Communication (MTC): communication performed by machines without human intervention. It may be called Machine-to-Machine (M2M) communication.

MTC terminal (MTC UE or MTC device or MRT apparatus): a terminal (e.g., a vending machine, meter, etc.) having a communication function (e.g., communication with an MTC server over PLMN) over a mobile communication network and performing a MTC function.

Radio Access Network (RAN): a unit including a Node B and a radio network controller (RNC) controlling the Node B in the 3GPP network. The RAN exists at a UE end and provides a connection to a core network.

Home Location Register (HLR)/Home Subscriber Server (HSS): a database containing subscriber information within the 3GPP network. The HSS can perform functions such as configuration storage, identity management, user state storage, etc.

Public Land Mobile Network (PLMN): a network configured for the purpose of providing mobile communication services to individuals. The PLMN can be configured for each operator.

Non-Access Stratum (NAS): a functional layer for exchanging signalling and a traffic message between a UE and a core network at the UMTS and EPS protocol stacks. The NAS mainly functions to support mobility of the UE and support a session management procedure for establishing and maintaining an IP connection between the UE and PDN GW.

Service Capability Exposure Function (SCEF): an entity within the 3GPP architecture for service capability exposure that provides a means to safely expose the services and capabilities provided by 3GPP network interfaces.

Mobility Management Entity (MME): A network node in the EPS network which performs mobility management and session management functions.

Packet Data Network Gateway (PDN-GW): A network node in the EPS network which performs UE IP address allocation, packet screening and filtering, and charging data collection functions.

Serving GW (Serving Gateway): A network node in the EPS network which performs functions such as mobility anchor, packet routing, idle mode packet buffering, and triggering paging for the ME of MME.

Policy and Charging Rule Function (PCRF): A node in the EPS network which performs policy decision to dynamically apply differentiated QoS and billing policies for each service flow.

Open Mobile Alliance Device Management (OMA DM): A protocol designed to manage mobile devices, such as mobile phones, PDAs, and portable computers, which performs functions such as device configuration, firmware upgrade, and error report.

Operation Administration and Maintenance (OAM): A network management function group which provides network fault indication, performance information, and data and diagnostic functions.

Packet Data Network (PDN): A network in which a server (e.g., MMS server, WAP server, etc.) supporting a specific service is located.

PDN connection: A connection from the UE to the PDN, i.e., the association (connection) between the UE represented by the IP address and the PDN represented by the APN.

EPS Mobility Management (EMM): a sublayer of the NAS layer, where the EMM may be in an "EMM-Registered" or "EMM-Deregistered" state depending on whether the UE is network attached or detached.

EMM Connection Management (ECM) connection: A signaling connection for the exchange of NAS messages, established between the UE and the MME. An ECM connection is a logical connection consisting of an RRC connection between the UE and an eNB and Si signaling connection between the eNB and the MME. When the ECM connection is established/terminated, the RRC and Si signaling connections are established/terminated as well. To the UE, the established ECM connection means having an RRC connection established with the eNB, and to the MME, it means having an S1 signaling connection established with the eNB. Depending on whether the NAS signaling connection, i.e., the ECM connection is established, the ECM may have an "ECM-Connected" or "ECM-Idle" state.

Access-Stratum (AS): It includes a protocol stack between the UE and the radio (or access) network and is responsible for transmitting data and network control signals.

NAS configuration Management Object (MO): A management object (MO) used to configure the UE with parameters related to NAS functionality.

Packet Data Network (PDN): A network in which a server (e.g., multimedia messaging service (MMS) server, wireless application protocol (WAP) server, etc.) supporting a specific service is located.

PDN connection: a logical connection between the UE and the PDN, represented by one IP address (one IPv4 address and/or one IPv6 prefix).

Access Point Name (APN): a string that refers to or identifies a PDN. In order to access the requested service or network, it goes through a specific P-GW, which means a predefined name (string) in the network so that the P-GW can be found. (e.g., internet.mnc012.mcc345.gprs)

Access Network Discovery and Selection Function (ANDSF): it is a network entity and provides policies that allow the UE to discover and select an available access on a per operator basis.

EPC path (or infrastructure data path): a user plane communication path through EPC.

E-UTRAN Radio Access Bearer (E-RAB): it refers to the concatenation of a S1 bearer and a corresponding data radio bearer. If there is an E-RAB, there is an one-to-one mapping between the E-RAB and the EPS bearer of the NAS.

GPRS Tunneling Protocol (GTP): a group of IP-based communications protocols used to carry general packet radio service (GPRS) within GSM, UMTS and LTE networks. Within the 3GPP architecture, GTP and proxy mobile IPV6-based interfaces are specified on various interface points. GTP can be decomposed into several protocols (e.g., GTP-C, GTP-U and GTP'). GTP-C is used within a GPRS core network for signalling between gateway GPRS support nodes (GGSN) and serving GPRS support nodes (SGSN). GTP-C allows the SGSN to activate a session (e.g., PDN context activation), deactivate the same session, adjust the quality of service parameters, or renew a session for a subscriber, that has just operated from another SGSN, for the user. GTP-U is used to carry user data within the GPRS core network and between the radio access network and the core network.

Hereinafter, the present disclosure is described based on the terms defined as above.

Three major requirement areas of 5G include (1) an enhanced mobile broadband (eMBB) area, (2) a massive machine type communication (mMTC) area, and (3) an ultra-reliable and low latency communications (URLLC) area.

Some use cases may require multiple areas for optimization, and other use case may be focused on only one key performance indicator (KPI). 5G supports these various use cases in a flexible and reliable method.

5G System Architecture to which the Present Disclosure is Applicable

A 5G system is an advanced technology from 4G LTE mobile communication technology and supports a new radio access technology (RAT), extended long term evolution (eLTE) as an extended technology of LTE, non-3GPP access (e.g., wireless local area network (WLAN) access), etc. through the evolution of the existing mobile communication network structure or a clean-state structure.

The 5G system is defined based on a service, and an interaction between network functions (NFs) in an architecture for the 5G system can be represented in two ways as follows.

Reference point representation: indicates an interaction between NF services in NFs described by a point-to-point reference point (e.g., N11) between two NFs (e.g., AMF and SMF).

Service-based representation: network functions (e.g., AMF) within a control plane (CP) allow other authenticated network functions to access its services. The representation also includes a point-to-point reference point, if necessary.

Overview of 3GPP System

FIG. 1 illustrates various reference points.

In an example of a network structure illustrated in FIG. 1, the SGW and the PDN GW are configured as separate gateways, but the two gateways may be implemented according to a single gateway configuration option.

The MME is an element to perform signaling and control functions for supporting access to the network connection of the UE, allocation, tracking, paging, roaming, and handover of network resources, and so on. The MME controls control plane functions related to subscribers and session management. The MME manages a large number of eNBs and performs signaling of the conventional gateway selection for handover to other 2G/3G networks. Further, the MME performs functions such as security procedures, terminal-to-network session handling, idle terminal location management, and so on.

The SGSN handles all packet data such as mobility management and authentication of the user for another 3GPP network (e.g., GPRS network).

The ePDG serves as a security node for an untrusted non-3GPP network (e.g., I-WLAN, Wi-Fi hotspot, etc.)

As described with reference to FIG. 1, the UE with IP capability can access the IP service network (e.g., IMS) provided by a service provider (i.e., operator) via various components within the EPC based on the non-3GPP access as well as the 3GPP access.

For example, reference points such as S1-U and S1-MME can connect two functions present in different functional entities. The 3GPP system defines a conceptual link connecting two functions present in different functional entities of E-UTRAN and EPC, as a reference point. The following Table 1 summarizes reference points illustrated in FIG. 4. In addition to the example of Table 1, various reference points can exist depending on the network structure.

TABLE 1

| reference point | description |
|---|---|
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point for the control plane protocol between MME and SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points illustrated in FIG. 1, S2a and S2b correspond to non-3GPP interfaces. S2a is a reference point to provide a user plane with related control and mobility support between the trusted non-3GPP access and the PDN GW. S2b is a reference point to provide a user plane with related control and mobility support between the ePDG and the PDN GW.

Figure 2:
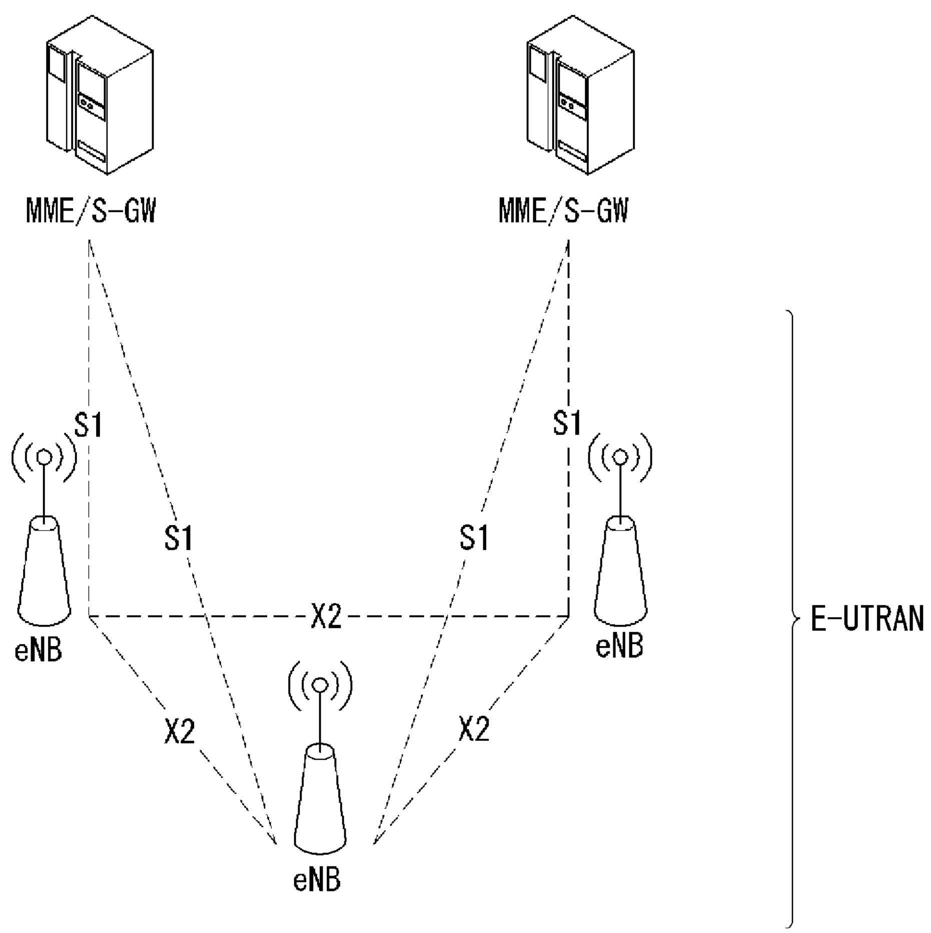
FIG. 2 is a view illustrating an example of a network structure of an evolved universal terrestrial radio access network (E-UTRAN) to which the present disclosure is applicable.

FIG. 2 illustrates an example of a network structure of an evolved universal terrestrial radio access network (E-UTRAN) to which the present disclosure is applicable.

An E-UTRAN system is an evolved version of the existing UTRAN system and may be, for example, 3GPP LTE/LTE-A system. Communication networks are widely deployed to provide various communication services such as voice (e.g., voice over Internet protocol (VOIP)) through IMS and packet data.

Referring to FIG. 2, an E-UMTS network includes an E-UTRAN, an EPC, and one or more UEs. The E-UTRAN consists of eNBs that provide control plane and user plane protocols to the UE, and the eNBs are interconnected with each other by means of the X2 interface.

X2 user plane (X2-U) interface is defined between the eNBs. The X2-U interface provides non-guaranteed delivery of a user plane packet data unit (PDU). X2 control plane (X2-CP) interface is defined between two neighboring eNBs. The X2-CP performs functions of context delivery between the eNBs, control of user plane tunnel between a source eNB and a target eNB, delivery of handover-related messages, uplink load management, and the like.

The eNB is connected to the UE via a radio interface and is connected to an evolved packet core (EPC) by means of the S1 interface.

S1 user plane (S1-U) interface is defined between the eNB and a serving gateway (S-GW). S1 control plane interface (S1-MME) is defined between the eNB and a mobility management entity (MME). The S1 interface performs functions of evolved packet system (EPS) bearer service management, non-access stratum (NAS) signaling transport, network sharing, MME load balancing, and so on. The Si interface supports many-to-many-relation between the eNB and the MME/S-GW.

The MME can perform various functions such as NAS signaling security, access stratum (AS) security control, inter-core network (CN) node signaling for supporting mobility between 3GPP access networks, idle mode UE reachability (including control and execution of paging retransmission), tracking area identity (TAI) management (for UE in idle and active modes), PDN GW and SGW selection, MME selection for handover with MME change, SGSN selection for handover to 2G or 3G 3GPP access networks, roaming, authentication, bearer management functions including dedicated bearer establishment, support of public warning system (PWS) (including earthquake and tsunami warning system (ETWS) and commercial mobile alert system (CMAS)) message transmission, and the like.

Figure 3:
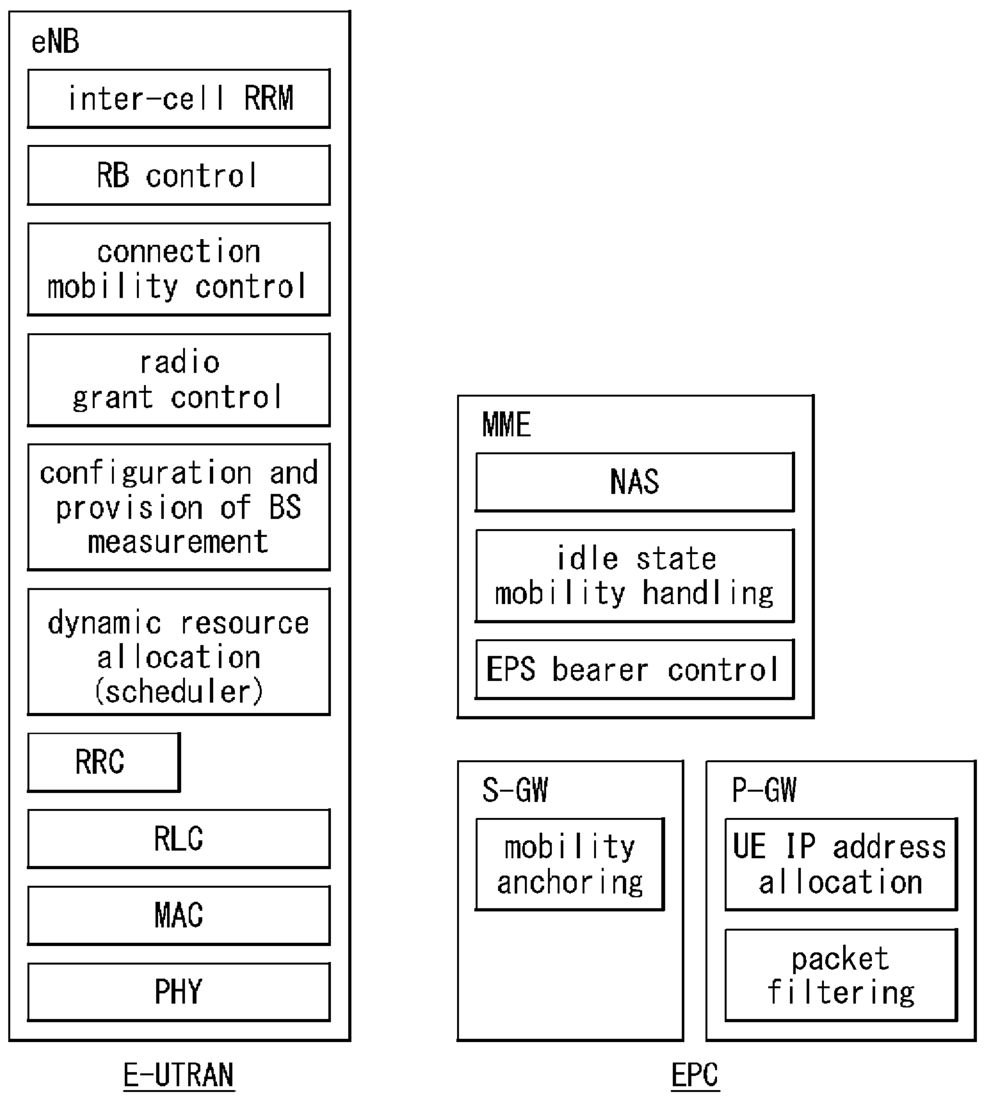
FIG. 3 is a view illustrating a general E-URTAN and an example of an architecture of an evolved packet core (EPC).

FIG. 3 is a view illustrating a general E-URTAN and an example of an architecture of an evolved packet core (EPC).

As illustrated in FIG. 3, the eNB can perform functions such as routing to gateway while radio resource control (RRC) connection is activated, scheduling and transmission of paging messages, scheduling and transmission of a broadcast channel (BCH), dynamic allocation of resources in uplink and downlink to the UE, configuration and provision for the measurement of the eNB, radio bearer control, radio admission control, and connection mobility control. The eNB can perform functions such as paging situation in the EPC, management of an LTE IDLE state, ciphering of a user plane, SAE bearer control, and ciphering and integrity protection of NAS signaling.

Annex J of 3GPP TR 23.799 shows various architectures by combining 5G and 4G. An architecture using NR and NGC is disclosed in 3GPP TS 23.501.

Figure 4:
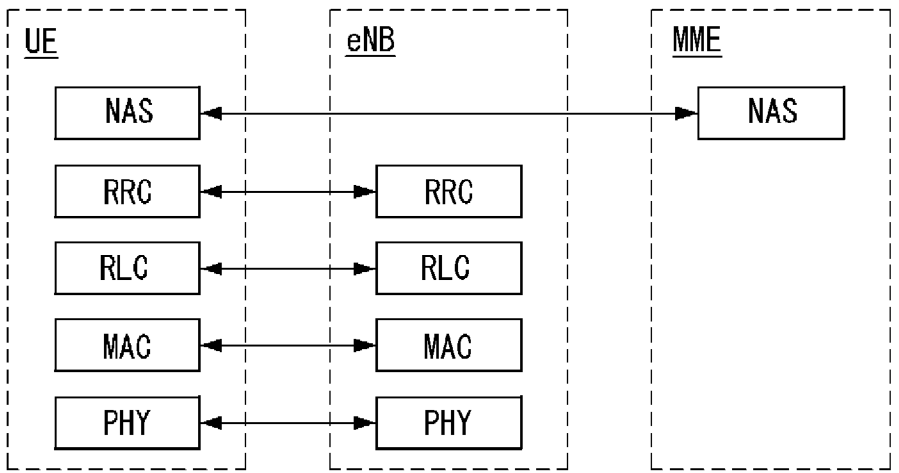
FIG. 4 is a view illustrating an example of a structure of a radio interface protocol in a control plane between user equipment (UE) and evolved node B (eNB).
Figure 5:
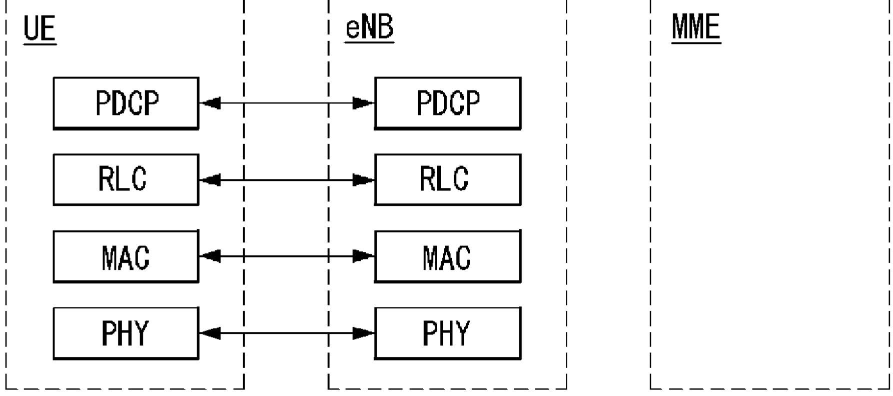
FIG. 5 is a view illustrating an example of a structure of a radio interface protocol in a user plane between UE and eNB.

FIG. 4 is a view illustrating an example of a structure of a radio interface protocol in a control plane between user equipment (UE) and evolved node B (eNB), and FIG. 5 is view illustrating an example of a structure of a radio interface protocol in a user plane between UE and eNB.

The radio interface protocol is based on 3GPP radio access network standard. The radio interface protocol horizontally consists of a physical layer, a data link layer, and a network layer, and is vertically divided into a user plane for data information transmission and a control plane for control signaling delivery.

The protocol layers may be divided into L1 (first layer), L2 (second layer), and L3 (third layer) based upon three lower layers of an open system interconnection (OSI) standard model that is well known in the art of communication systems.

The layers of the radio protocol in the control plane illustrated in FIG. 4 and the layers of the radio protocol in the user plane illustrated in FIG. 5 are described below.

The physical layer, the first layer, provides an information transfer service using a physical channel. The physical layer is connected with a medium access control (MAC) layer located at a higher level via a transport channel, and data between the MAC layer and the physical layer is transferred via the transport channel. Data is transferred between different physical layers, i.e., between physical layers of a transmission side and a reception side via the physical channel.

The physical channel consists of several subframes on a time axis and several subcarriers on a frequency axis. Here, one subframe consists of a plurality of OFDM symbols and a plurality of subcarriers on the time axis. One subframe consists of a plurality of resource blocks, and one resource block consists of a plurality of OFDM symbols and a plurality of subcarriers. A unit time, a transmission time interval (TTI), at which data is transmitted is 1 ms corresponding to one subframe.

Physical channels existing in the physical layers of the transmission side and the reception side may be divided into a physical downlink shared channel (PDSCH) and a physical uplink shared channel (PUSCH) that are data channels, and a physical downlink control channel (PDCCH), a physical control format indicator channel (PCFICH), a physical hybrid-ARQ indicator channel (PHICH), and a physical uplink control channel (PUCCH) that are control channels, according to 3GPP LTE.

There are several layers in the second layer. A medium access control (MAC) layer of the second layer functions to map various logical channels to various transfer channels, and also performs a function of logical channel multiplexing for mapping several logical channels to one transfer channel. The MAC layer is connected to a radio link control (RLC) layer, that is an upper layer, via the logical channel. The logical channel is roughly divided into a control channel used to transmit information of the control plane and a traffic channel used to transmit information of the user plane according to a type of transmitted information.

The MAC layer of the second layer segments and concatenate data received from the upper layer and adjusts a data size so that a lower layer is adapted to transmit data to a radio section.

A packet data convergence protocol (PDCP) layer of the second layer performs a header compression function of reducing an IP packet header size that has a relatively large size and contains unnecessary control information, in order to efficiently transmit data in a radio section having a small bandwidth upon transmission of IP packet such as IPv4 or IPV6. In addition, in the LTE system, the PDCP layer also performs a security function, which consists of ciphering for preventing data interception by a third party and integrity protection for preventing data manipulation by a third party.

A radio resource control (RRC) layer located at the uppermost part of the third layer is defined only in the control plane and is responsible for controlling logical channels, transport channels, and physical channels in relation to configuration, re-configuration, and release of radio bearers (RBs). The RB means services provided by the second layer to ensure data transfer between the UE and the E-UTRAN.

If an RRC connection is established between an RRC layer of the UE and an RRC layer of a wireless network, the UE is in an RRC connected mode. Otherwise, the UE is in an RRC idle mode.

An RRC state of the UE and an RRC connection method are described below. The RRC state refers to a state in which the RRC of the UE is or is not logically connected with the RRC of the E-UTRAN. The RRC state of the UE having logical connection with the RRC of the E-UTRAN is referred to as an RRC_CONNECTED state, and the RRC state of the UE not having logical connection with the RRC of the E-UTRAN is referred to as an RRC_IDLE state. Since the UE in the RRC_CONNECTED state has the RRC connection, the E-UTRAN can identify the presence of the corresponding UE on a per cell basis and thus efficiently control the UE. On the other hand, the E-UTRAN cannot identify the presence of the UE of the RRC_IDLE state, and the UE in the RRC_IDLE state is managed by a core network based on a tracking area (TA) which is an area unit larger than the cell. That is, for the UE in the RRC_IDLE state, only presence or absence of the corresponding UE is identified in an area unit larger than the cell. In order for the UE of the RRC IDLE state to receive typical mobile communication services such as voice and data, the UE should transition to the RRC_CONNECTED state. Each TA is distinguished from another TA by a tracking area identity (TAI) thereof. The UE may configure the TAI through a tracking area code (TAC) which is information broadcasted from a cell.

When the user initially turns on the UE, the UE first searches for a proper cell, and then establishes RRC connection in the corresponding cell and registers information of the UE in the core network. Thereafter, the UE stays in the RRC_IDLE state. The UE staying in the RRC_IDLE state (re)selects a cell and checks system information or paging information, if necessary. This operation is called camping on a cell. Only when the UE staying in the RRC_IDLE state needs to establish the RRC connection, the UE establishes the RRC connection with the RRC layer of the E-UTRAN through a RRC connection procedure and transitions to the RRC_CONNECTED state. There are several cases where the UE remaining in the RRC_IDLE state needs to establish the RRC connection. For example, the cases may include an attempt of a user to make a phone call, an attempt to transmit data, or transmission of a response message when receiving a paging message from the E-UTRAN.

A non-access stratum (NAS) layer positioned over the RRC layer performs functions such as session management and mobility management.

The NAS layer shown in FIG. 4 is described in detail below.

The evolved session management (ESM) belonging to the NAS layer performs functions such as default bearer management and dedicated bearer management to control the UE to use a PS service from a network. The default bearer resources are allocated from a network when they are accessed to the network upon first access to a specific packet data network (PDN). In this instance, the network allocates an IP address available for the UE so that the UE can use a data service, and also allocates QoS of a default bearer. LTE roughly supports two types of bearers including a bearer with guaranteed bit rate (GBR) QoS characteristics for guaranteeing a specific bandwidth for data transmission/reception and a non-GBR bearer with best effort QoS characteristics without guaranteeing a bandwidth. The default bearer is allocated the non-GBR bearer. The dedicated bearer may be allocated a bearer with GBR or non-GBR QOS characteristics.

A bearer that the network allocates to the UE is referred to as an evolved packet service (EPS) bearer. When the network allocates the EPS bearer to the UE, the network assigns one ID. This ID is called an EPS bearer ID. One EPS bearer has QoS characteristics of a maximum bit rate (MBR) and/or a guaranteed bit rate (GBR).

Figure 6:
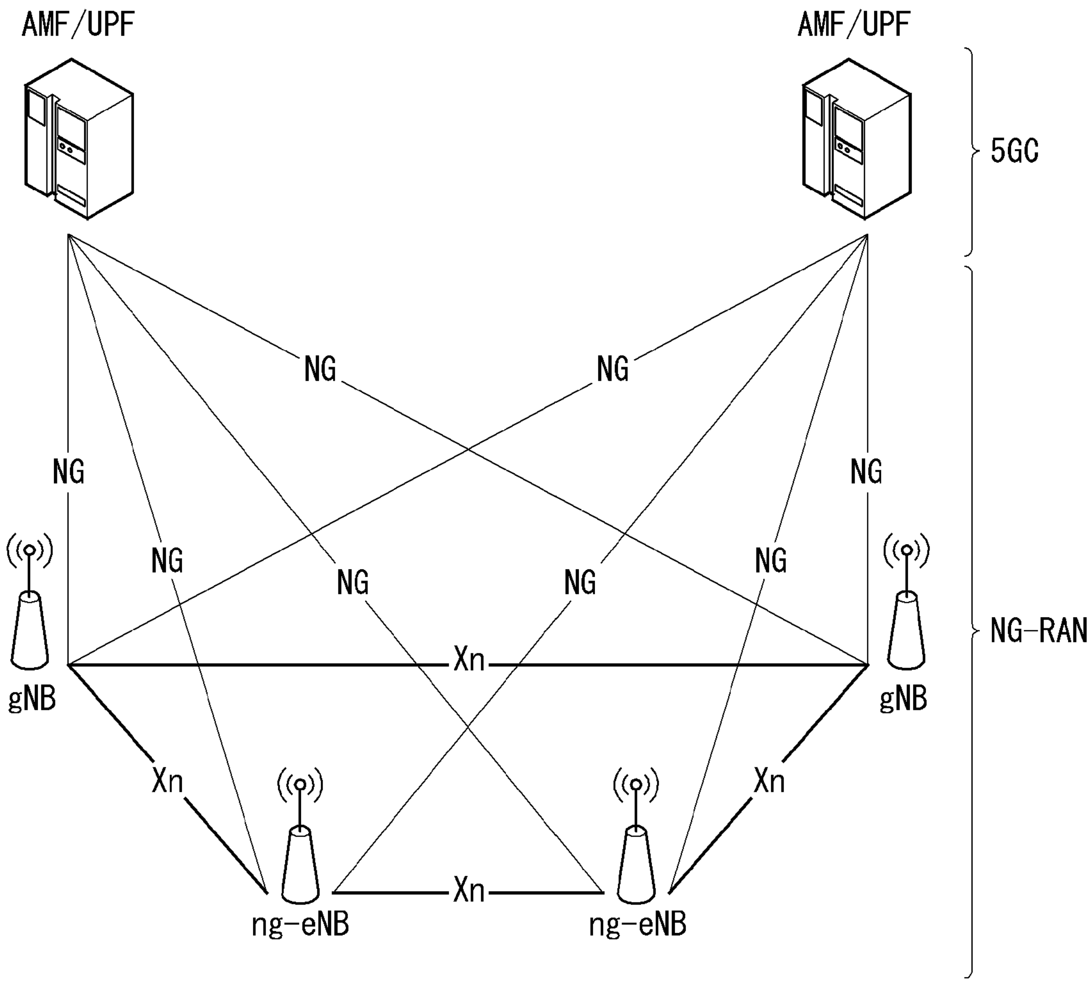
FIG. 6 is a view illustrating an example of an architecture of a general new radio (NR)-radio access network (RAN).

FIG. 6 is a view illustrating an example of an architecture of a general new radio (NR)-radio access network (RAN). Referring to FIG. 6, a NG-RAN node may be one of the following nodes.

gNB providing NR user plane and control plane protocols towards UE, or ng-eNB providing E-UTRA user plane and control plane protocols towards UE gNB and ng-eNB are connected to each other through an Xn interface. In addition, gNB and ng-eNB are connected to an access and mobility management function (AMF) and to a user plane function (UPF) through NG interfaces for 5GC, more particularly, through an NG-C interface and an NG-U interface respectively (refer to 3GPP TS 23.501 [3]).

For reference, an architecture for functional separation and an F1 interface are defined in 3GPP TS 38.401 [4].

Figure 7:
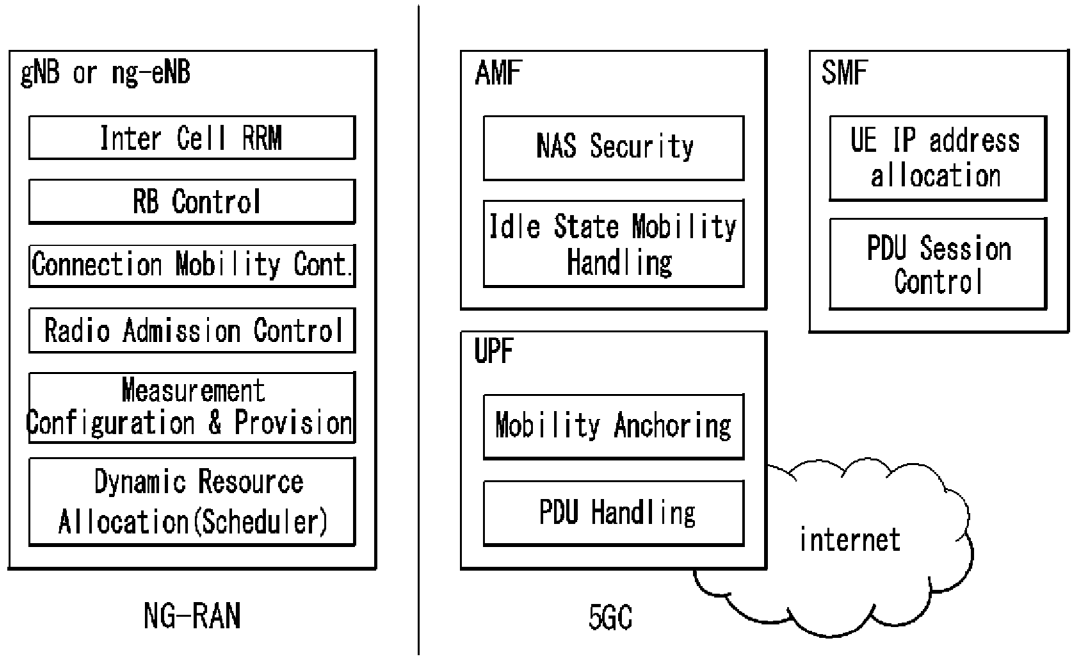
FIG. 7 is a view illustrating an example of functional separation of a general NG-RAN and a 5th generation core (5GC).

FIG. 7 is a view illustrating an example of functional separation of a general NG-RAN and a 5th generation core (5GC). Referring to FIG. 7, a yellow box represents logical nodes, and a white box represents a main function.

gNB and ng-eNB host the following functions.

Wireless resource management function: wireless bearer control, wireless authentication control, access mobility control, and dynamic resource allocation for UE both in uplink and downlink (scheduling)

IP header compression, encryption and data integrity protection

Selecting AMF in IMT-2000 3GPP-UE attachment file, in case routing for AMF cannot be determined based on information provided from UE User plane data routing to UPF Forwarding control plane information to AMF Connection configuration and disconnection Paging message scheduling and transmission System broadcast information scheduling and transmission (provided in AMF or OAM)

Measurement for mobility and scheduling and configuration of measurement report

Transmission-level packet marking of uplink

Session management

Network slicing support

QS flow management and mapping for data wireless bearer

Support of UE in RRC_INACTIVE state

NAS message distribution function

Radio access network share

Dual connectivity

Closed interworking between NR and E-UTRA

AMF hosts the following main functions (refer to 3GPP TS 23.501 [3]).

NAS signal termination

NAS signal security

AS security control

Signal transfer between CN nodes for moving between 3GPP access networks

Idle mode UE connectivity (including paging retransmission control and execution)

Registration area management

Mobility support inside system and between systems

Access authentication

Access authorization including confirmation of roaming authority

Mobility management control (subscription and policy)

Network slicing support

SMF selection

UPF hosts the following main functions (refer to 3GPP TS 23.501 [3]).

Anchor point for intra-/inter-RAT mobility (if any)

External PDU session point interconnected with data network

Packet routing and forwarding

Packet check and user plane part of policy rule enforcement

Traffic usage report

Uplink classifier supporting traffic flow to data network

Bifurcation for multi-horned PDU session support

QoS processing for user plane (e.g. packet filtering, gate, UL/DL rate enforcement)

Uplink traffic certification (SDF and QoS flow mapping)

Downlink packet buffering and downlink data notification triggering

Session management function (SMF) hosts the following main functions (refer to 3GPP TS 23.501 [3]).

Session management

UE IP address allocation and management

UP function selection and control

Figure 8:
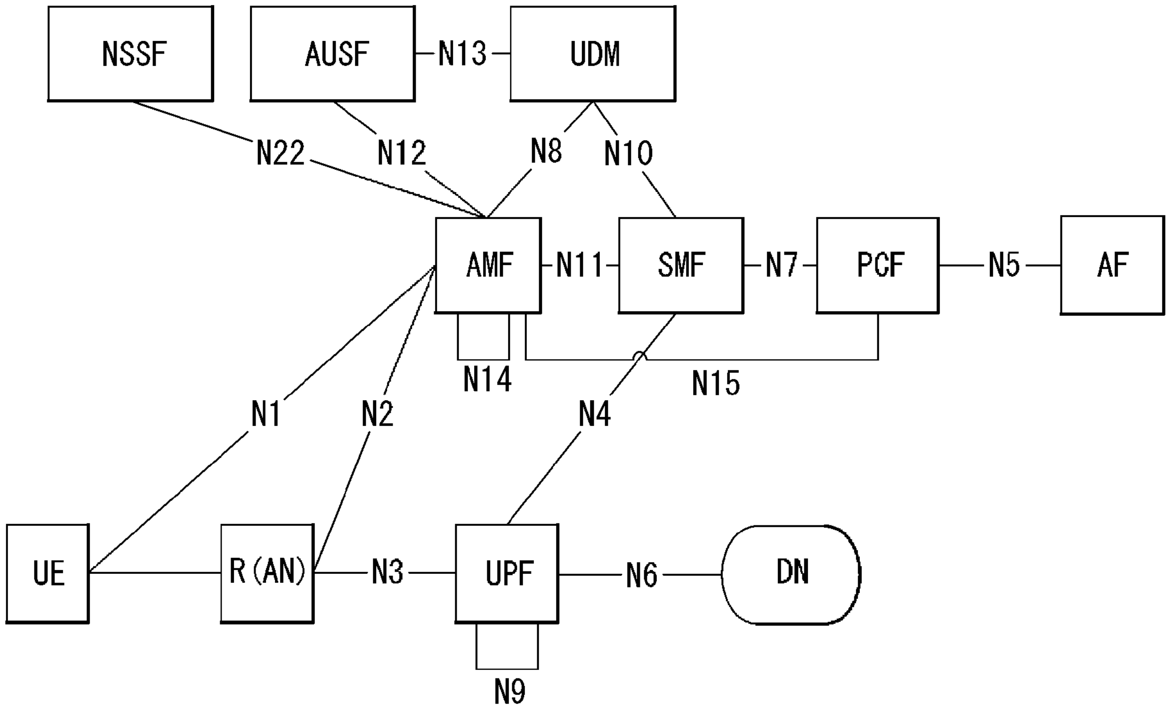
FIG. 8 is a view illustrating an example of a general architecture of a 5th generation (5G) system.

Configuring traffic steering to route traffic to an appropriate destination in UPF Policy enforcement and partial control of QoS Downlink data notification FIG. 8 is a view illustrating an example of a general architecture of a 5th generation (5G) system. Hereinafter, each reference interface and each node in FIG. 8 will be described.

Access and mobility management function (AMF) supports such functions as signaling between CN nodes for mobility between 3GPP access networks, termination of a radio access network (RAN) CP interface (N2), termination of NAS signaling (N1), registration management (registration area), idle mode UE reachability, support of network slicing, and SMF selection.

Some or all the functions of AMF may be supported in a single instance of one AMF.

Data network (DN) means an operator service, an Internet access or 3rd party service and the like, for example. DN transmits a downlink protocol data unit (PDU) or receives a PDU from a UPF, which UE transmits.

Policy control function (PCF) receives information on a packet flow from an application server and provides a function of determining policies like mobility management and session management.

Session management function (SMF) provides a session management function, and when UE has a plurality of sessions, each session may be managed by different SMFs.

Some or all the functions of SMF may be supported in a single instance of one SMF.

Unified data management (UDM) stores a user's subscription data, policy data and the like.

User plane function (UPF) forwards a downlink PDU, which is received from a DN, to UE via (R)AN and forwards an uplink PDU, which is received from UE, to a DN via (R)AN.

Application function (AF) operates with a 3GPP core network for service provision (e.g., for supporting functions like application effect on traffic routing, network capability exposure access, mutual operation with policy framework for policy control).

(Radio) access network ((R)AN) collectively refers to new radio access networks that support both evolved E-UTRA, which is an evolved version of 4G radio access, and a new radio (NR) access technology (e.g. eNB).

gNB supports functions for wireless resource management (that is, radio bearer control, radio admission control, connection mobility control, dynamic allocation of resources to UE in uplink/downlink (that is, scheduling)).

User equipment (UE) means a user device.

In a 3GPP system, a conception link connecting NFs in a 5G system is defined as a reference point.

N1 means a reference point between UE and AMF, N2 means a reference point between (R)AN and AMF, N3 means a reference point between (R)AN and UPF, N4 means a reference point between SMF and UPF, N6 means a reference point between UPF and a data network, N9 means a reference point between 2 core UPFs, N5 means a reference point between PCF and AF, N7 means a reference point between SMF and PCF, N24 means a reference point between PCF in a visited network and PCF in a home network, N8 means a reference point between UDM and AMF, N10 means a reference point between UDM and SMF, N11 means a reference point between AMF and SMF, N12 means a reference point between AMF and authentication server function (AUSF), N13 means a reference point between UDM and AUSF, N14 means a reference point between 2 AMFs, N15 means a reference point between PCF and AMF in the case of non-roaming scenario and a reference point between PCF in a visited network and AMF in the case of a roaming scenario, N16 means a reference point between 2 SMFs (in a roaming scenario, a reference point between SMF in a visited network and SMF in a home network), N17 means a reference point between AMF and 5G-equipment identify register (EIR), N18 means a reference point between AMF and unstructured data storage function (UDSF), N22 means a reference point between AMF and network slice selection function (NSSF), N23 means a reference point between PCF and network data analytics function (NWDAF), N24 means a reference point between NSSF and NWDAF, N27 means a reference point between network repository function (NRF) in a visited network and NRF in a home network, N31 means a reference point between NSSF in a visited network and NSSF in a home network, N32 means a reference point between security protection proxy (SEPP) in a visited network and SEPP in a home network, N33 means a reference point between network exposure function and AF, N40 means a reference point between SMF and charging function (CHF), and N50 means a reference point between AMF and circuit bearer control function (CBCF).

Meanwhile, for convenience of explanation, FIG. 8 exemplifies a reference model for a case in which UE has an access to one DN by using one PDU session, but the present disclosure is not limited thereto.

For convenience of explanation, the above description was based on an EPS system using eNB, but it may be replaced by a 5G system by using gNB instead of eNB, AMF instead of mobility management (MM) function of MME, SMF as SM function of S/P-GW, and UPF as user plane-related function of S/P-GW.

In this specification, the above description was based on EPS, but corresponding contents may also be supported in a 5G system through similar operations through a process/message/information with similar objectives.

Communication System Applicable to the Present Disclosure

Although not limited thereto, various descriptions, functions, procedures, proposals, methods and/or operation flowcharts disclosed in the present disclosure are applicable to various fields requiring wireless communication/connection (e.g., 5G) between devices.

Hereinafter, it will be described in greater detail with reference to the drawings. In the following drawings/description, the same reference numerals may denote the same or corresponding hardware blocks, software blocks or functional blocks unless otherwise stated.

Wireless Device Applicable to the Present Disclosure

Figure 9:
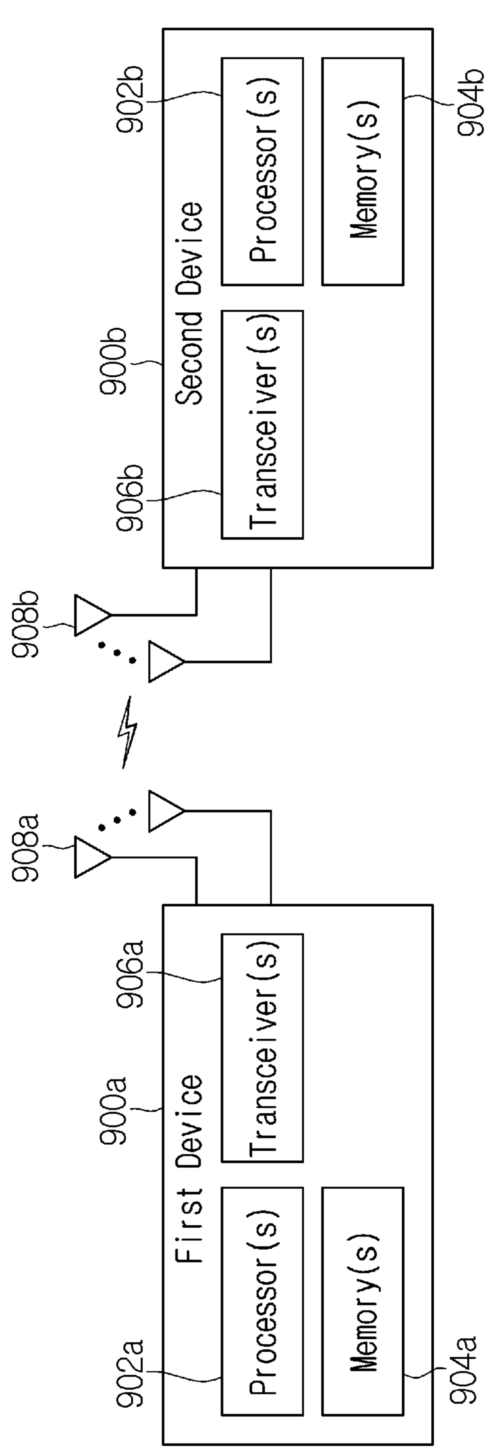
FIG. 9 is a view illustrating an example of a wireless device applicable to the present disclosure.

FIG. 9 is a view illustrating an example of a wireless device applicable to the present disclosure.

Referring to FIG. 9, a first wireless device 900*a* and a second wireless device 900*b* may transmit and receive radio signals through various radio access technologies (e.g., LTE, NR). Herein, the first wireless device 900*a* and the second wireless device 900*b* may correspond to (the wireless device 100*x*, the base station 120) and/or (the wireless device 100*x*, the base station 100*x*) of FIG. 1.

The first wireless device 900*a* may include at least one processor 902*a* and at least one memory 904*a* and further include at least one transceiver 906*a* and/or at least one antenna 908*a*. The processor 902*a* may be configured to control the memory 904*a* and/or the transceiver 906*a* and to implement descriptions, functions, procedures, proposals, methods and/or operational flowcharts disclosed in this document. For example, the processor 902*a* may process information in the memory 904*a*, generate first information/signal, and then transmit a wireless signal including the first information/signal through the transceiver 906*a*. In addition, the processor 902*a* may receive a wireless signal including second information/signal through the transceiver 906*a* and then store information obtained from signal processing of the second information/signal in the memory 904*a*. The memory 904*a* may be coupled to the processor 902*a* and store various types of information associated with the operation of the processor 902*a*.

The second wireless device 900*b* may include at least one processor 902*b* and at least one memory 904*b* and further include at least one transceiver 906*b* and/or at least one antenna 908*b*. The processor 902*b* may be configured to control the memory 904*b* and/or the transceiver 906*b* and to implement descriptions, functions, procedures, proposals, methods and/or operational flowcharts disclosed in this document. For example, the processor 902*b* may process information in the memory 904*b*, generate third information/signal, and then transmit a wireless signal including the third information/signal through the transceiver 906*b*. In addition, the processor 902*b* may receive a wireless signal including fourth information/signal through the transceiver 906*b* and then store information obtained from signal processing of the fourth information/signal in the memory 904*b*. The memory 904*b* may be coupled to the processor 902*b* and store various types of information associated with the operation of the processor 902*b*. For example, the memory 904*b* may perform some or all of the processes controlled by the processor 902*b* or store software codes including instructions for implementing descriptions, functions, procedures, proposals, methods and/or operational flowcharts disclosed in this document. Herein, the processor 902*b* and the memory 904*b* may be a part of a communication modem/circuit/chip designed for implementing a radio communication technology (e.g., LTE, NR). The transceiver 906*b* may be coupled to the processor 902*b* and transmit and/or receive a wireless signal through at least one antenna 908*b*. The transceiver 906*b* may include a transmitter and/or a receiver. The transceiver 906*b* is interchangeable with a RF unit. In the present disclosure, a wireless device may also mean a communication modem/circuit/chip.

Wireless Device Structure Applicable to the Present Disclosure

Figures 10, 11:
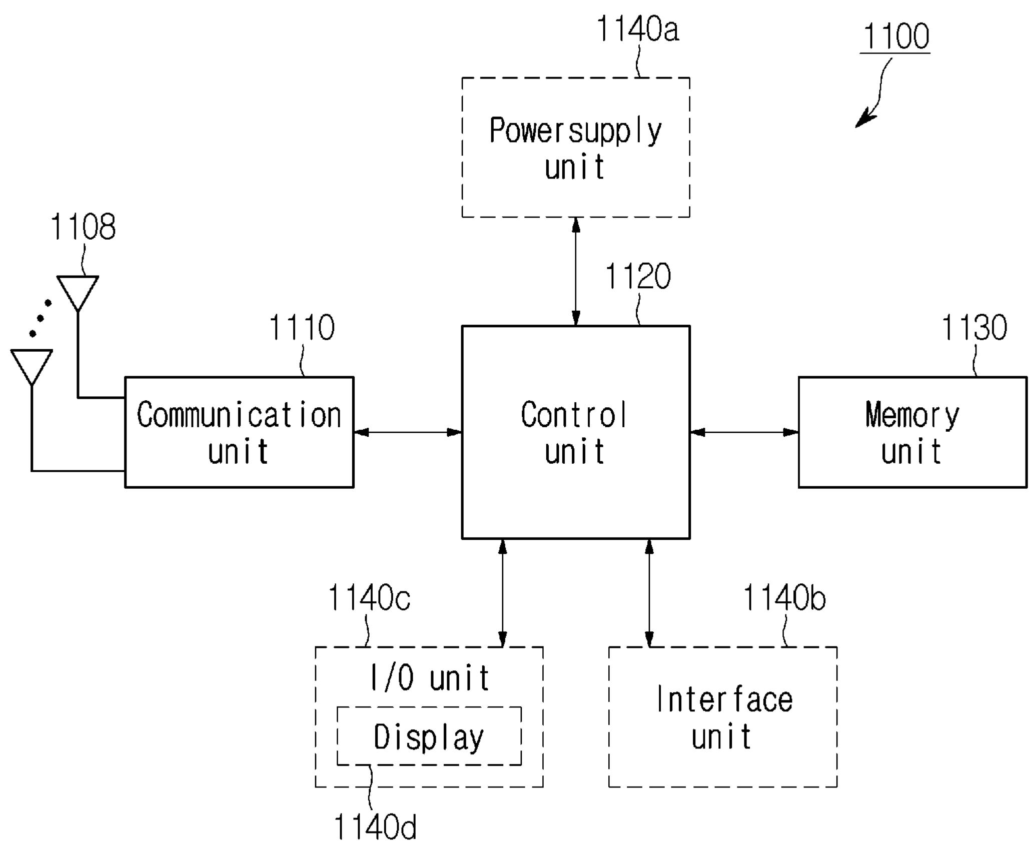
FIG. 10 is a view illustrating another example of a wireless device applicable to the present disclosure.
FIG. 11 is a view illustrating an example of a hand-held device applicable to the present disclosure.

FIG. 10 is a view illustrating another example of a wireless device applicable to the present disclosure.

Referring to FIG. 10, a wireless device 1300 may correspond to the wireless devices 900*a* and 900*b* of FIG. 9 and be composed of various elements, components, units and/or modules. For example, a wireless device 1000 may include a communication unit 1010, a controller 1020, a memory unit 1030, and an additional element 1040. The communication unit may include a communication circuit 1012 and a transceiver(s) 1014. For example, the communication circuit 1012 may include the one or more processors 902*a* and 902*b* and/or one or more memories 904*a* and 904*b* of FIG. 9. For example, the transceiver(s) 1014 may include the one or more transceivers 906*a* and 906*b* and/or one or more antennas 908*a* and 908*b* of FIG. 9. The controller 1020 is electrically coupled to the communication unit 1010, the memory unit 1030 and the additional element 1040 and controls an overall operation of a wireless device. For example, the controller 1020 may control an electrical/mechanical operation of a wireless device based on a program/code/instruction/information stored in the memory unit 1030. In addition, the controller 1020 may transmit information stored in the memory unit 1030 to an outside (e.g., another communication device) through the communication unit 1010 via a wireless/wired interface or store information received from an outside (e.g., another communication device) through the communication unit 1010 via a wireless/wired interface in the memory unit 1030.

The additional element 1040 may be configured in various ways according to a type of a wireless device. For example, the additional element 1040 may include at least one of a power unit/battery, an input/output unit, a driving unit, and a computing unit. The wireless device 1000 may be embodied in forms of a robot, a vehicle, an XR device, a hand-held device, a home appliance, an IoT device, a digital broadcasting terminal, a hologram device, a public safety device, an MTC device, a medical device, a fintech device (or financial device), a security device, a climate/environment device, an AI server/device, a base station, and a network node, although not limited thereto. The wireless device may be movable or be used in a fixed place according to a use example/service.

In FIG. 10, various elements, components, units/parts, and/or modules of the wireless device 1000 may all be connected with each other through a wired interface, or at least some may be wirelessly connected through the communication unit 1010. For example, the controller 1020 and the communication unit 1010 in the wireless device 1000 may be connected on a wire, and the controller 1020 and another component may be wirelessly connected through the communication unit 1010. In addition, each of elements, components, units and/or modules in the wireless device 1000 may further include one or more elements. For example, the controller 1020 may be configured by a set of one or more processors. For example, the controller 1020 may be configured by a set of a communication control processor, an application processor, an electronic control unit (ECU), a graphic processing processor, a memory control processor, and the like. As another example, the memory unit 1030 may be configured by a RAM, a dynamic RAM (DRAM), a ROM, a flash memory, a volatile memory, a non-volatile memory, and/or a combination thereof.

Hand-Held Device Applicable to the Present Disclosure

FIG. 11 is a view illustrating an example of a hand-held device applicable to the present disclosure.

FIG. 11 exemplifies a hand-held device applicable to the present disclosure. The hand-held device may include a smartphone, a smart pad, a wearable device (e.g., a smart watch, smart glasses), a portable computer (e.g., a notebook and the like) and the like. The hand-held device may be referred to as a mobile station (MS), a user terminal (UT), a mobile subscriber station (MSS), a subscriber station (SS), an advanced mobile station (AMS), or a wireless terminal (WT).

Referring to FIG. 11, a hand-held device 1100 may include an antenna unit 1108, a communication unit 1110, a controller 1120, a memory unit 1130, a power supply unit 1140*a*, an interface unit 1140*b*, and an input/output unit 1140*c*. The antenna unit 1108 may be configured as a part of the communication unit 1110. Blocks 1110~1130/1140*a*~1140*c* correspond to the blocks 1010~1030/1040 of FIG. 10, respectively.

The communication unit 1110 may transmit and receive signals (e.g., data, control signals, etc.) to and from another wireless device and base stations. The controller 1120 may perform various operations by controlling components of the hand-held device 1100. The controller 1120 may include an application processor (AP). The memory unit 1130 may store data/parameters/programs/codes/instructions necessary to drive the hand-held device 1100. In addition, the memory unit 1130 may store input/output data/information and the like. The power supply unit 1140*a* may supply power to the hand-held device 1100 and include a wired/wireless charge circuit, a battery, and the like. The interface unit 1140*b* may support a connection between the hand-held device 1100 and another external device. The interface unit 1140*b* may include various ports for connections with external devices (e.g., audio input/output port, video input/output port). The input/output unit 1140*c* may receive image information/signal, audio information/signal, data, and/or information input from a user as inputs or output these types of information. The input/output unit 1140*c* may include a camera, a microphone, a user input unit, a display unit 1140*d*, a speaker and/or a haptic module, and the like.

As an example, in case of data communication, the input/output unit 1140*c* obtains input information/signal (e.g., touch, character, voice, image, video) from a user, and the obtained information/signal may be stored in the memory unit 1130. The communication unit 1110 may convert information/signal stored in a memory to a wireless signal and transmit the wireless signal thus converted directly to another wireless device or to a base station. In addition, the communication unit 1110 receives a wireless signal from another wireless device or a base station and then restore the received wireless signal to original information/signal. The restored information/signal may be stored in the memory unit 1130 and then be output in various forms (e.g., character, voice, image, video, haptic) through the input/output unit 1140*c*.

As an example, in a new wireless communication system (e.g., 5G), a private network may be constructed to provide a non-public network (NPN) function. NPNs may be distinguished into public network integrated NPNs (PNI-NPNs) supported through a public network and standalone NPNs (SNPNs) constructing a separate network. Herein, a UE needs to hold a credential of each NPN beforehand in order to access the NPN. That is, a UE may access only an NPN for which the UE holds a credential beforehand. However, for a UE which always holds a credential beforehand, a method of accessing a corresponding NPN by dynamically receiving a credential may be needed. Herein, when a credential is dynamically allocated to a UE, the terminal needs to be dynamically allocated a credential of a corresponding SNPN while security is being maintained, which will be described below.

As an example, a PNI-NPN may be an NPN available through a PLMN. Herein, when a UE wants to access an NPN through a PNI-NPN, the UE may need PLMN subscription to access the PNI-NPN. On the other hand, an SNPN may be a network operating independently without dependence upon a public network. Accordingly, an SNPN may not support interworking with an evolved packed system (EPS) and not support an emergency service. As another example, an SNPN may not support a roaming service and is not limited to a specific embodiment. That is, an SNPN may be a private network operating independently of a public network. Hereinafter will be described a method for being allocated a credential through authentication during an onboarding process based on an SNPN, but the present disclosure may not be limited thereto.

As an example, when a UE wants to access an SNPN, the UE may access the SNPN through a PNMN or directly access the SNPN, but is not limited to a specific embodiment. Hereinafter, for convenience of explanation, a UE will be described to perform direct access to an SNPN, but is not limited thereto.

As an example, when a UE wants to access an SNPN, the UE may hold a credential for the SNPN, which the UE wants to access, and access the SNPN based on the credential. As another example, a UE may be dynamically allocated a credential through a credential of a credential holder (CH) holding a credential of an SNPN and access the SNPN through the allocated credential. As a concrete example, a UE may access an SNPN that is no fixed but located in various regions based on mobility. Herein, since the UE has a limitation to holding every credential of the SNPN, the UE needs to be dynamically allocated a credential of the SNPN, which the UE wants to access, based on a credential holder.

Figure 12:
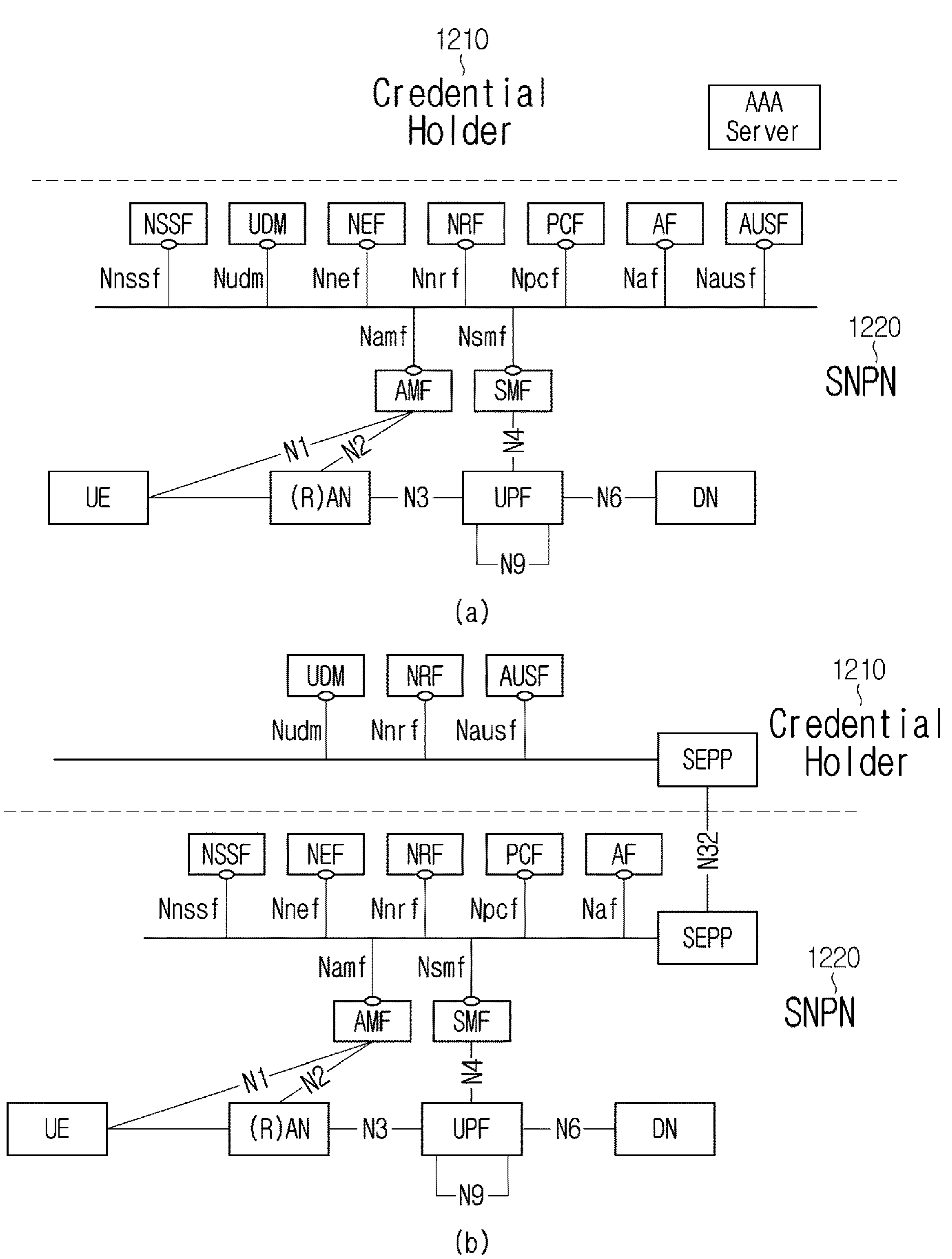
FIG. 12 is a view illustrating a method for performing access to an SNPN through a credential of a credential holder by a UE applied to the present disclosure.

As an example, FIG. 12 is a view illustrating a method for performing access to an SNPN through a credential of a credential holder by a UE applied to the present disclosure. Referring to FIG. 12A and FIG. 12B, a UE may be allocated a credential of an SNPN 1220, which the UE wants to access, through a credential of a credential holder 1210 and perform access to the SNPN 1220. As an example, an authentication, authorization and accounting (AAA) server for an access credential of an SNPN may be located outside of the SNPN. An AAA server may be a server that manages authentication based on a UE verification process, authorization based on authentication of a UE, and an account of a UE. Herein, the credential holder 1210 may perform authentication for a corresponding UE based on the AAA server and provide a credential of the SNPN 1220, which the UE wants to access, to the UE.

In addition, as an example, configuration information for SNPN access may be broadcast through a NG-RAN node that provides SNPN connection. As an example, broadcast information may include at least one or more PLMN IDs and at least any one piece of NID list information for identifying an accessible NPN through a NG-RAN according to each PLMN ID. In addition, as an example, broadcast information may further include at least one of an indicator indicating whether access support is possible for each SNPN through a credential of an external credential holder, a GNI list supported for each SNPN, and an indicator indicating whether or not to permit a registration attempt for UEs, for which no explicit SNPN is indicated for selection, according to each SNPN, but is not limited to a specific embodiment.

Based on what is described above, when a UE obtains an SNPN-related configuration and subscription information, the UE may obtain any one or more of a PLMN ID for each subscribed SNPN and a network identifier (NID) of the SNPN. In addition, a UE capable of SNPN connection may obtain at least any one or more of a subscriber identifier (SUPI) and a credential. In addition, a UE capable of SNPN connection may further obtain at least any one of a N3IWF fully qualified domain name (N3IWF FQDN) and ID information of a country where a non-3GPP interworking function (N3IWF) is located, as N3IWF-related information for non-3GPP access network access, but is not limited thereto.

In addition, when SNPN access is supported using a credential of a credential holder for each subscribed SNPN, a UE may further obtain at least any one of preferred SNPN list information controlled by the UE, preferred SNPN list information controlled by the credential holder, and GIN list information controlled by the credential holder, but is not limited thereto. Herein, as an example, the preferred SNPN list information controlled by the credential holder and the GIN list information controlled by the credential holder may be updated by the credential holder. Herein, as an example, the above-described information obtained by the UE may be broadcast by a NG-RAN, and this is the same as described above.

In addition, based on what is described above, it is possible to consider a method for selecting an SNPN by a UE. As an example, a UE capable of SNPN access may select an SNPN based on an SNPN access mode.

When no SNPN access mode is permitted, even a UE capable of SNPN access may not be able to access an SNPN but perform a PLMN selection procedure. In addition, in the case of a UE capable of accessing an SNPN and a PLMN at the same time, when an SNPN access mode is configured, the UE may access only an SNPN, but is not limited thereto.

On the other hand, a UE, for which an SNPN access mode is configured, may perform connection to an SNPN. Herein, as an example, the UE may select a network based on whether SNPN access is supported through a credential of a credential holder.

As an example, in the case of an automatic network selection mode, a UE may first access an SNPN connected last. When the first access to an SNPN connected last is impossible, a UE may access an SNPN identified by a SUPI of the UE and a PLMN ID or NID holding a credential.

In addition, as an impossible case of automatic network selection based on what is described above, if a UE supports SNPN access using a credential of a credential holder, the UE may perform access through an available SNPN. Herein, the available SNPN may be determined based on at least any one of preferred SNPN list information controlled by the UE, preferred SNPN list information controlled by a credential holder, and GIN list information controlled by the credential holder. As another example, an available SNPN may be determined based on an SNPN available as a credential holder, which is not included in preferred SNPN list information controlled by a credential holder and GIN list information controlled by the credential holder and is not explicitly indicated from a network, but the present disclosure is not limited to a specific embodiment.

Herein, as an example, one credential could conventionally correspond to one SNPN ID, but based on what is described above, a plurality of credentials may be present in one SNPN ID, and a plurality of SNPN IDs may be present in one credential, but the present disclosure is not limited to a specific form. Then, a UE may select and access one SNPN based on available SNPN.

In addition, as an example, when SNPN access is supported using a credential of a credential holder in a manual network selection mode, a UE may identify an SNPN list supporting access through a credential of a credential holder and configure it as an available SNPN but may not be limited to a specific form.

A UE may select an SNPN based on available SNPNs. Herein, the UE may configure a list of subscriber data and select an SNPN based on the list of subscriber data. As an example, a list of subscriber data may include at least any one or more of a subscriber ID in a form of SUPI, credential information, and an SNPN identifier. As an example, a list of subscriber data may include configuration information for each SNPN based on a UE, and validity information for each SNPN may be recorded. As an example, a UE may not perform connection to an SNPN which is set as invalid in a list of subscriber data. Herein, the UE may not perform connection to the SNPN set as invalid until a USIM is newly inserted or power is turned on again.

As an example, as described above, a UE capable of SNPN connection may support SNPN access by using a credential of a credential holder (CH). Herein, the credential holder is an entity separated from an SNPN and may perform authentication for SNPN connection of the UE and authorize access.

As a concrete example, an AAA server of a credential holder may authenticate and authorize SNPN connection of a UE. Herein, the AAA server may be a server that manages authentication based on a UE verification process, authorization based on authentication of a UE, and an account of a UE.

As an example, an authentication server function (AUSF) of an SNPN may authenticate and authorize a UE based on a credential provided from an AAA server in a credential holder. Herein, when user data management (UDM) of the SNPN indicates to an AUSF of the SNPN that authentication is needed based on an AAA server of a credential holder, the AUSF may search for and select an AAA server and deliver an extensible authentication protocol (EAP) message first to the AAA server that serves as an EAP server which performs authentication. Herein, when authentication and authorization are performed based on the AAA server, an SUPI may be used as information for identifying a UE. When authentication is completed based on the AAA server, an AMF and an SMF of the SNPN may read UE subscription information from the UDM based on the above-described SUPI. Through what is described above, the UE may perform authentication through a credential of a credential holder, obtain authority for SNPN connection, and perform SNPN connection.

Next, a method for performing onboarding and provisioning by a UE may be needed. As an example, an onboarding process and a provisioning process may be needed for a UE to access an NPN. As an example, an onboarding process may mean that an onboarding SNPN (O-SNPN) in charge of the onboarding process authenticates a UE and provides connectivity to a provisioning server that manages a credential of an SNPN. Herein, the O-SNPN, which is an SNPN in charge of onboarding, may be included in an SNPN as a logical entity or be an SNPN separate from the SNPN, but may not be limited to a specific form.

In addition, a provisioning process may mean providing a credential of an SNPN to a UE after verifying whether the UE connected through an onboarding process has access authentication. That is, the UE may perform authentication during an onboarding process through an O-SNPN, be dynamically allocated a credential through a provisioning server during a provisioning process, and access an SNPN.

As an example, based on what is described above, a UE, which does not hold a credential of an SNPN beforehand, may be dynamically allocated the credential with safety, access the SNPN, and use a service.

Figure 13:
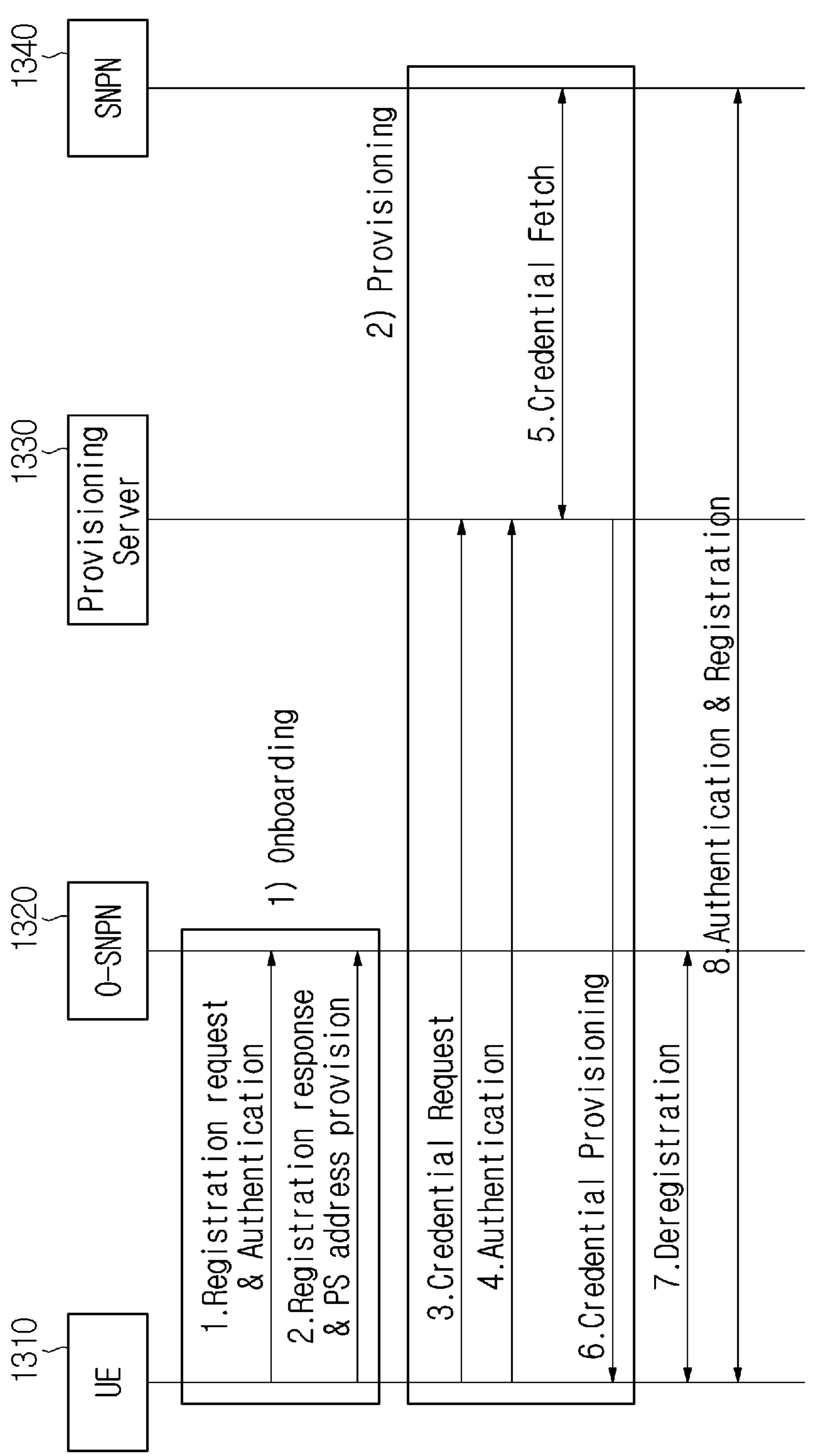
FIG. 13 is a view illustrating a method for being dynamically provided a credential based on an O-SNPN applied to the present disclosure.

FIG. 13 is a view illustrating a method for being dynamically provided a credential based on an O-SNPN applied to the present disclosure. Referring to FIG. 13, a UE 1310 may be dynamically allocated a credential of an SNPN 1340 and access the SNPN 1340. As an example, the UE may not hold the credential of the SNPN 1340 and be dynamically allocated a credential based on an O-SNPN 1320. Specifically, an onboarding process and a provisioning process may be needed for a UE to be dynamically allocated a credential of an SNP. An onboarding process may mean that an SNPN (that is, the O-SNPN 1320) in charge of the onboarding process authenticates a UE and provides connectivity to a provisioning server 1330 that manages a credential of an SNPN, and this is the same as described above. Referring to FIG. 13, the UE 1310 may transmit a registration and authentication request to the O-SNPN 1320 and obtain a registration response and provisioning server address information from the O-SNPN 1320. Thus, the UE may be provided with connectivity of the provisioning server 1330.

Next, a provisioning process may mean providing a credential of the SNPN 1340 to a UE after verifying whether the UE connected through an onboarding process has access authentication. The UE 1310 may transmit a credential request to the server 1330, and the provisioning server 1330 may perform authentication based on the credential request. Herein, the provisioning server 1330 may share a credential fetch with the SNPN 1340, which the UE 1310 wants to access, and provide the credential of the SNPN 1340 to the UE 1310 based on this. Herein, when the UE 1310 obtains the credential of the SNPN 1340 which the UE 1310 wants to access, the UE 1310 may deregister from the O-SNPN 1320. Then, the UE 1310 may access the SNPN 1340 based on the obtained credential.

Herein, as an example, as described above, when a UE obtains a credential of a corresponding SNPN through an O-SNPN, an operation regarding how to perform mutual authentication between the UE and the O-SNPN may be needed. When a UE performs an onboarding process, authentication for an O-SNPN needs to be performed, and as the UE does not have all credentials for the O-SNPN, a method for authenticating an O-SNPN may be needed. That is, mutual authentication between a UE and an O-SNPN needs to be ensured, and an authenticating operation for it may be needed.

In addition, as an example, after mutual authentication between a UE and an O-SNPN is performed, a specific scheme for providing connectivity to a provisioning server may be needed. As an example, connectivity may be provided based on a control plane, or connectivity may be provided based on a user plane, but it may not be limited to a specific form.

In addition, as an example, a provisioning server may be located outside, and a UE may be dynamically allocated a credential during mutual authentication between the UE and the provisioning server. Accordingly, specific methods may be needed to perform mutual authentication between a UE and a provisioning server.

Herein, as an example, mutual authentication between a UE and an O-SNPN may be performed in consideration of what is described above, and FIG. 14 may be a method for performing mutual authentication between a UE and a provisioning server.

Figure 14:
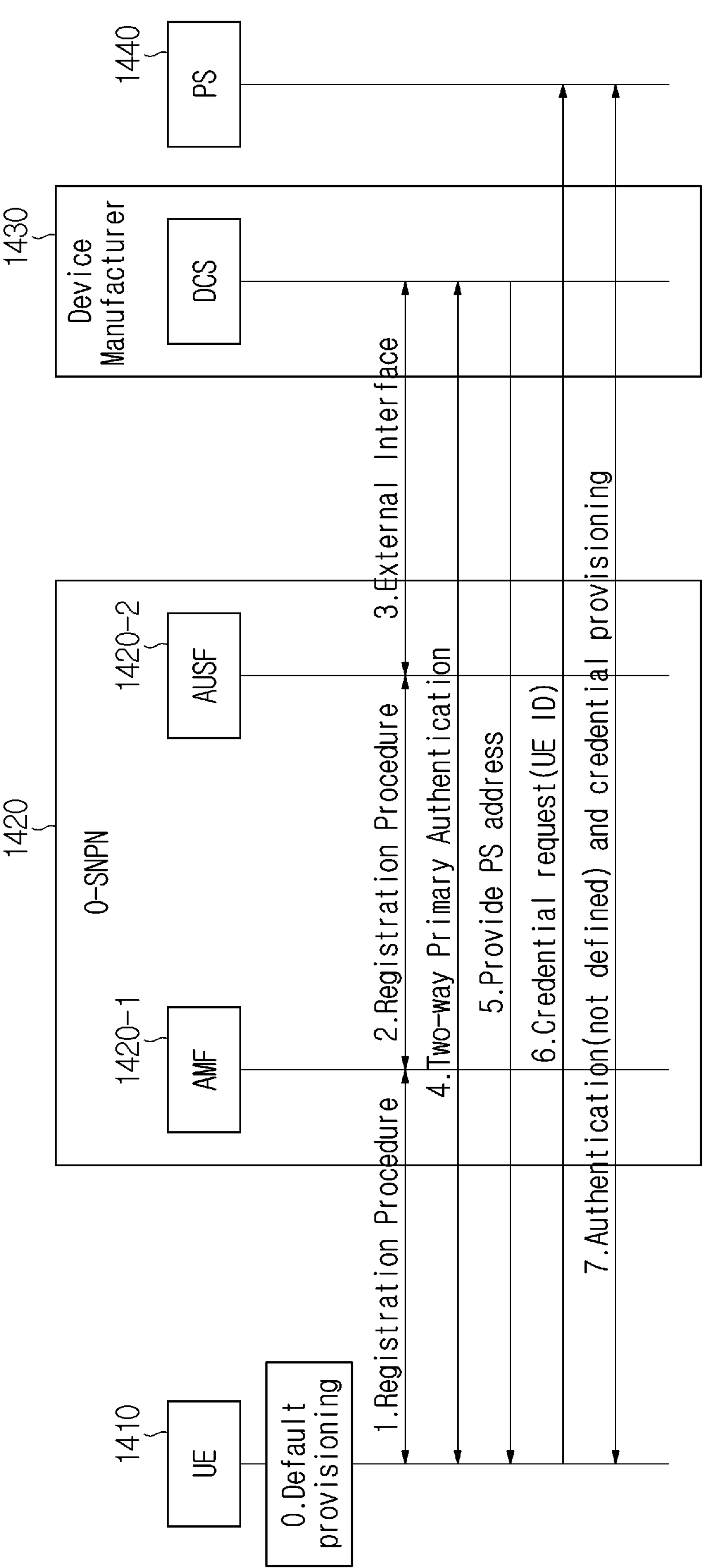
FIG. 14 may be a two-way authentication scheme applied in the present disclosure.

As an example, FIG. 14 may be a two-way authentication scheme applied in the present disclosure. Referring to FIG. 14, a UE may be provided with a default credential (e.g., secret key or certificate) to be used for future onboarding authentication at a manufacturing time based on a manufacturer and a unique ID distinguishable in the manufacturer. Herein, the unique ID may have a form of a network access identifier (NAI) (e.g., username@domain). That is, a UE 1410 may hold a default credential and a unique ID beforehand that may be used for onboarding authentication.

Herein, the UE 1410 may search for and select a nearby O-SNPN 1420 and transmit a registration request including a unique ID. Herein, as an example, an AMF 1420-1 of the O-SNPN 1420 may check a registration procedure with the UE and deliver a registration message to an AUSF 1420-2 in charge of authentication. As an example, as described above, the UE may hold a default credential and a unique ID but may not hold a credential for the O-SNPN 1420 itself. Herein, the AUSF 1420-2 may establish a business contract with a manufacturer default credential server (DCS) 1420 for authentication beforehand and hold an external interface. As an example, the DCS 1420 may be located either inside or outside the O-SNPN 1420 but is not limited to a specific embodiment. The AUSF 1420-2 may form an interface with the DCS 1430 beforehand and request authentication based on the interface thus configured. That is, for authentication of the UE 1410, the AUSF 1420-2 and the DCS 1430 may need an external interface formed beforehand as security connection. Herein, as an example, in case the DCS 1430 is an existing AAA server, the AUSF 1420-2 needs to serve as a proxy that converts a 5GS service based interface (SBI) to an external AAA interface. That is, the AUSF 1420-2 needs to be provided with a proxy function. On the other hand, in case the DCS 1430 recognizes 5GS and supports AUSF and UDM functions, the AUSF 1420-2 of an O-SNPN may deliver a registration message in two ways.

That is, in order to perform security connection based on an interface, the AUSF 1420-2 needs to have a proxy function, or the AUSF and UDM functions based on 5GS need to be supported to the DCS 1430.

Next, the AUSF 1420-2 may identify a domain part in the delivered registration message, identify and select the DCS 1430 that will perform connection, and request start of mutual authentication between the UE 1410 and the DCS 1430. Then, the UE 1410 and the DCS 1430 may perform mutual authentication. As an example, an EAP protocol supported by a manufacturer may be used as a mutual authentication scheme, and when authentication is successful, the DCS 1430 may deliver an authentication result to the AUSF 1420-2.

Next, the DCS 1430 may deliver an address of the provisioning server (PS) 1440, which manages a credential of an SNPN that the UE 1410 wants to access, to the UE 1410 based on the success of the authentication. As an example, the DCS 1430 and the PS 1440 may have an interface based on a contract beforehand. The UE 1410 may transmit a message for requesting the credential of the SNPN based on a UE ID to the PS 1440. Herein, as an example, a transmission path of the message for requesting the credential of the SNPN may be through a user plane having a PDU session through the O-SNPN 1420. As another example, a transmission path of the message for requesting the credential of the SNPN may be through a control plane connected with NFs of the O-SNPN 1420 but may not be limited to a specific form. Next, the PS 1440 may perform authentication for the UE 1410 and provide the credential of the SNPN to the UE 1410.

As described above, although two-way authentication for a UE and the O-SNPN 1420 may be performed, because it is necessary for the AUSF 1420-2 to perform a proxy function by considering an interface between the AUSF 1420-2 and the DCS 1430 or for the DCS 1430 to recognize 5GS and support AUSF and UDM function, there may be a limitation in the two-way authentication.

Figure 15:
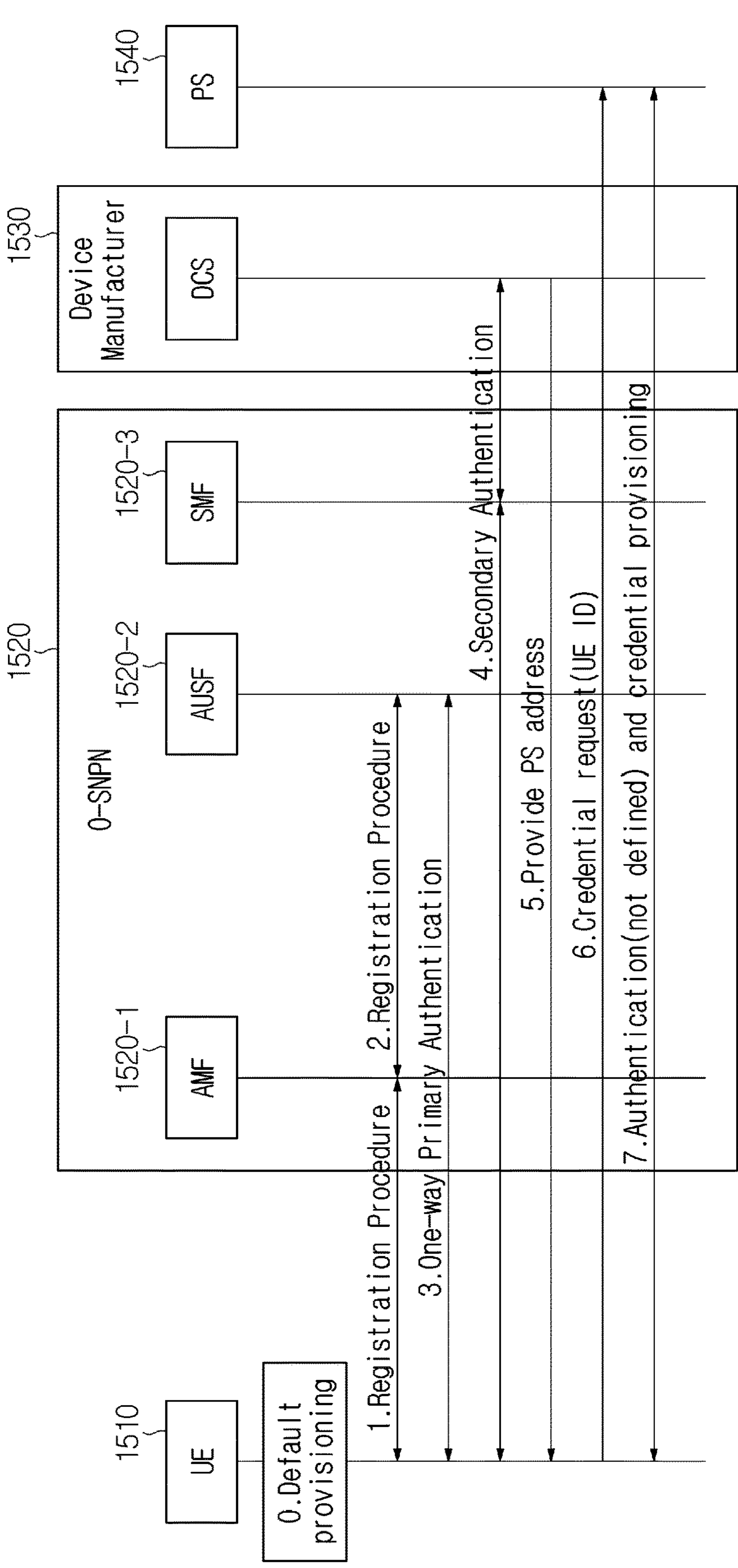
FIG. 15 may be a one-way authentication scheme applied in the present disclosure.

As another example, considering what is described above, an operation as shown in FIG. 15 may be possible. FIG. 15 may be a one-way authentication scheme applied in the present disclosure. Referring to FIG. 15, a UE 1510 may be provided with a default credential (e.g., secret key or certificate) to be used for future onboarding authentication at a manufacturing time based on a manufacturer and a unique ID distinguishable in the manufacturer. Herein, the unique ID may have a form of a network access identifier (NAI) (e.g., username@domain). That is, the UE 1510 may hold a default credential and a unique ID beforehand that may be used for onboarding authentication.

Herein, the UE 1510 may search for and select a nearby O-SNPN 1520 and transmit a registration request including the unique ID. Herein, as an example, an AMF 1520-1 of the O-SNPN 1520 may check a registration procedure with the UE and deliver a registration message to an AUSF 1520-2 in charge of authentication. Herein, unlike FIG. 14, the AUSF 1520-2 may perform one-way authentication (one-way primary authentication). Herein, the one-way primary authentication may mean that the UE 1510 verify the O-SNPN 1520 and the O-SNPN 1520 does not verify the UE 1510. This may be implemented by including only a certificate of the O-SNPN at a server side in extensible authentication protocol-transport layer security (EAP-TLS), but is not limited to a specific form. As an example, EAP-TLS as an extensible authentication protocol may be used for security authentication in wireless LAN hardware and software. As an example, during an EAP-TLS handshake process, a certificate of an O-SNPN may be delivered to a UE, and the UE may verify the O-SNPN through a root-of-trust certificate that the UE received through a default credential to be used for onboarding authentication. That is, it may be a one-way primary authentication where only the UE 1510 authenticates the O-SNPN 1520, while the O-SNPN 1520 does not authenticate the UE 1510.

Herein, the verification of the UE may be performed by performing secondary authentication with the DCS 1530. As an example, in case secondary authentication is performed between the UE 1510 and the DCS 1530, an SMF 1520-3 of the O-SNPN 1520 may select the DCS 1530 through a domain part of a UE ID. Herein, the DCS 1530 may perform the authentication based on the UE ID and a default credential.

Next, the DCS 1530 may deliver an address of the provisioning server (PS) 1540, which manages a credential of an SNPN that the UE 1510 wants to access, to the UE 1510 based on the success of the authentication. As an example, the DCS 1530 and the PS 1540 may have an interface based on a contract beforehand. The UE 1510 may transmit a message for requesting the credential of the SNPN based on a UE ID to the PS 1540. Herein, as an example, a transmission path of the message for requesting the credential of the SNPN may be through a user plane having a PDU session through the O-SNPN 1520. As another example, a transmission path of the message for requesting the credential of the SNPN may be through a control plane connected with NFs of the O-SNPN 1520 but may not be limited to a specific form. Next, the PS 1540 may perform authentication for the UE 1510 and provide the credential of the SNPN to the UE 1510. Herein, as an example, the PS 1530 may need to authenticate the UE 1510.

Herein, as described above, if the UE 1510 authenticates only the O-SNPN 1520 and the O-SNPN 1520 does not authenticate the UE 1510, a DOS attack may be possible, and security may become weak.

As described above, a UE may perform authentication based on two-way authentication (like in FIG. 15) and one-way authentication (like in FIG. 15). Herein, as an example, in case an AUSF of an O-SNPN is modifiable or a DCS supports a 5G system, two-way authentication based on FIG. 14 may be performed in consideration of security. However, authentication based on the scheme of FIG. 14 may need a proxy of an AUSF to support an existing AAA server, and a manufacturer may have to implement a 5GS core function. That is, security may be enhanced based on FIG. 14, but the above-described function may be required. On the other hand, based on FIG. 15, no separate 5G core system modification may be needed, but one-way authentication may have weak security, that is, be vulnerable to a DOS attack, since UE authentication is skipped, which is the same as described above.

Figure 16:
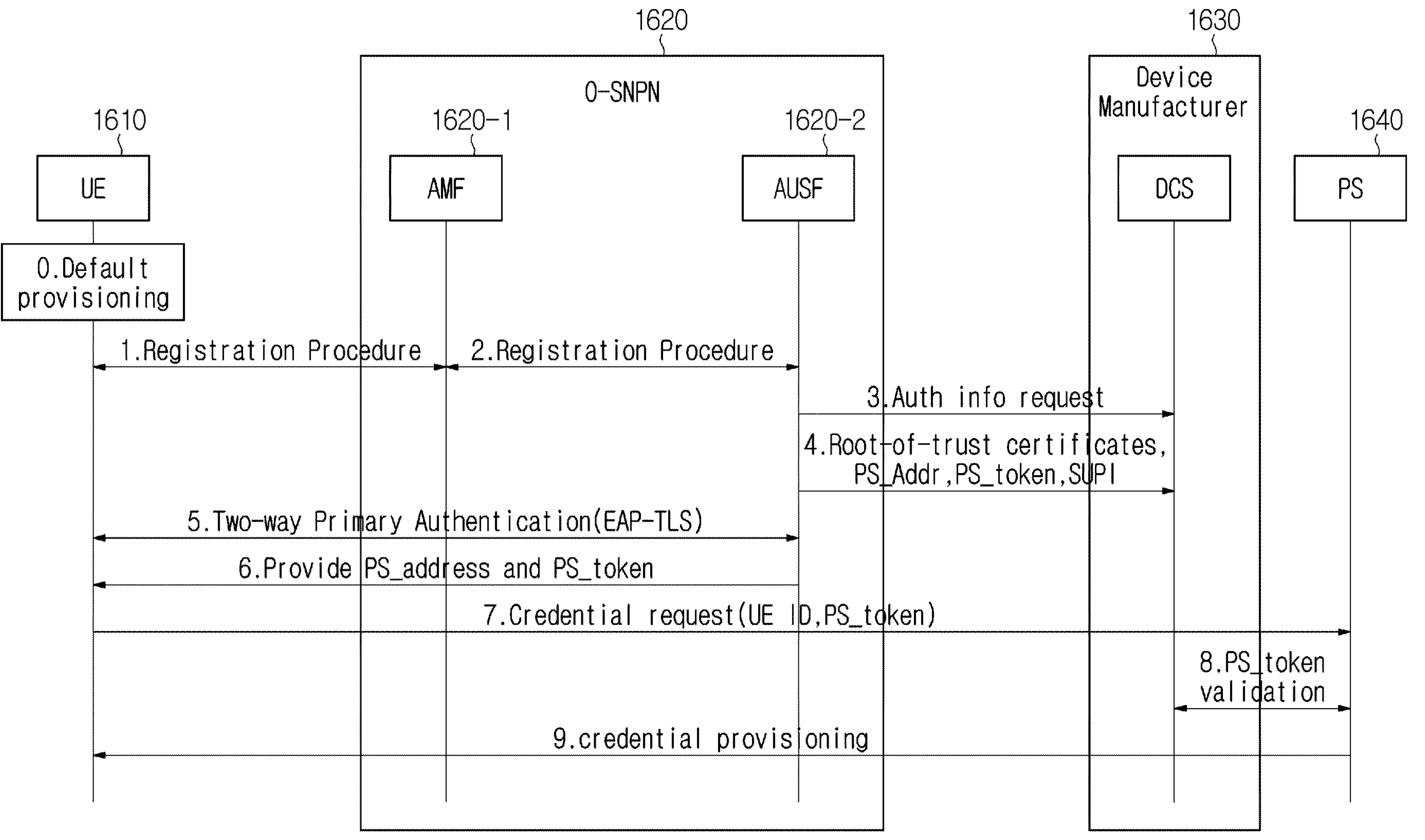
FIG. 16 is a view illustrating a method for performing authentication applied to the present disclosure.

Considering what is described above, FIG. 16 is a view illustrating a method for performing authentication applied to the present disclosure. As an example, FIG. 16 may be an improved authentication method that makes up for the disadvantage of the schemes of FIG. 14 and FIG. 15. Referring to FIG. 16, as described above, a UE 1610 may perform primary authentication with an AUSF 1620-1. Herein, as an example, the UE 1610 may obtain a public key from a DCS 1630 during a manufacturing process. That is, the UE 1610 may have the above-described default credential information and a public key for the DCS 1630 beforehand. The UE 1610 may generate SUCI based on the public key for the DCS 1630 and request registration to the AUSF 1620-1 through the SUCI. Herein, the AUSF 1620-2 may confirm the DCS 1630 for the UE 1610 through the SUCI and request authentication information to the confirmed DCS 1630. That is, unlike FIG. 14, the O-SNPN 1620 may request information for performing authentication for the UE 1610 to the DCS 1630, without requesting authentication for the UE 1610 to the DCS 1630. As an example, an authentication information request transmitted by the AUSF 1620-2 may include the above-described SUCI, and the DCS 1630 may provide necessary information for authenticating the UE 1610 to the AUSF 1620-2 based on the SUCI. That is, the AUSF 1620-2 may receive root-of-trust certificates of the UE based on the authentication information from the DCS 1630. The AUSF 1620-2 may receive SUPI from the DCS 1630. In addition, the AUSF 1620-2 may further receive provisioning server address information (PS_address) and provisioning token information (PS_token) necessary for performing authentication with a provisioning server later. Then, the AUSF 1620-2 may perform two-way authentication with the UE 1610 based on the received information and an EAP-TLS and deliver the PS_address and the PS_token to the UE 1610.

As a concrete example, the UE 1610 may be provided with a default credential (e.g., secret key or certificate) to be used for future onboarding authentication at a manufacturing time based on a manufacturer and a unique ID distinguishable in the manufacturer. Herein, the unique ID may have a form of a network access identifier (NAI) (e.g., username@domain). That is, the UE 1610 may hold a default credential and a unique ID beforehand that may be used for onboarding authentication.

Herein, the UE 1610 may search for and select a nearby O-SNPN 1620 and transmit a registration request including SUCI which is generated based on the unique ID. Herein, as an example, an AMF 1620-1 of the O-SNPN 1620 may check a registration procedure with the UE and deliver a registration message to an AUSF 1620-2 in charge of authentication.

Herein, the AUSF 1620-2 may determine to perform a two-way authentication process. As an example, the AUSF 1620-2 may request information necessary for authentication, including a UE ID and a target SNPN ID, to the DCS 1630. As an example, there may already be a contract relation between the O-SNPN 1620 and the DCS 1630, but is not limited to a specific embodiment. Then, the DCS 1630 may deliver root-of-trust certificates of the UE 1610, SUPI, a provisioning server address (PS_address) managing a credential of the SNPN, a PS token (PS_token) necessary for performing authentication with the PS to the O-SNPN 1620. Herein, the AUSF 1620-2 of the O-SNPN may perform two-way primary authentication based on an EAP-TLS protocol with the UE 1610 by using the information received from the DCS 1630. Then, when the authentication is completed, the AUSF 1620-2 may deliver the provisioning server address managing a credential of an SNPN, which the UE wants to access, and a PS token used for UE authentication in the PS 1640 to the UE 1610.

Next, based on the provisioning server address information thus delivered, the UE 1610 may transmit a credential request message of the SNPN to the PS 1640. Herein, the credential request message may include the UE ID and the PS token. As an example, there may be a contract between the DCS 1630 and the PS 1640, but is not limited to a specific embodiment. Herein, a transmission path may be a user plane having a PDU session through the O-SNPN 1620. As another example, the transmission path may be a control plane connecting to NFs of the O-SNPN and may not be limited to a specific form.

Next, the PS 1640 may specify the DCS 1630 by a domain part of the received UE ID and deliver the UE ID and the PS token to the DCS 1630 to request authentication. Herein, the DCS 1630 may perform authentication based on whether the UE ID is the same as a PS token issued in onboarding and respond to the PS 1640 with an authentication result. Based on what is described above, when the UE authentication is completed, the PS 1640 may deliver a credential of the SNPN to the UE 1610.

Figure 17:
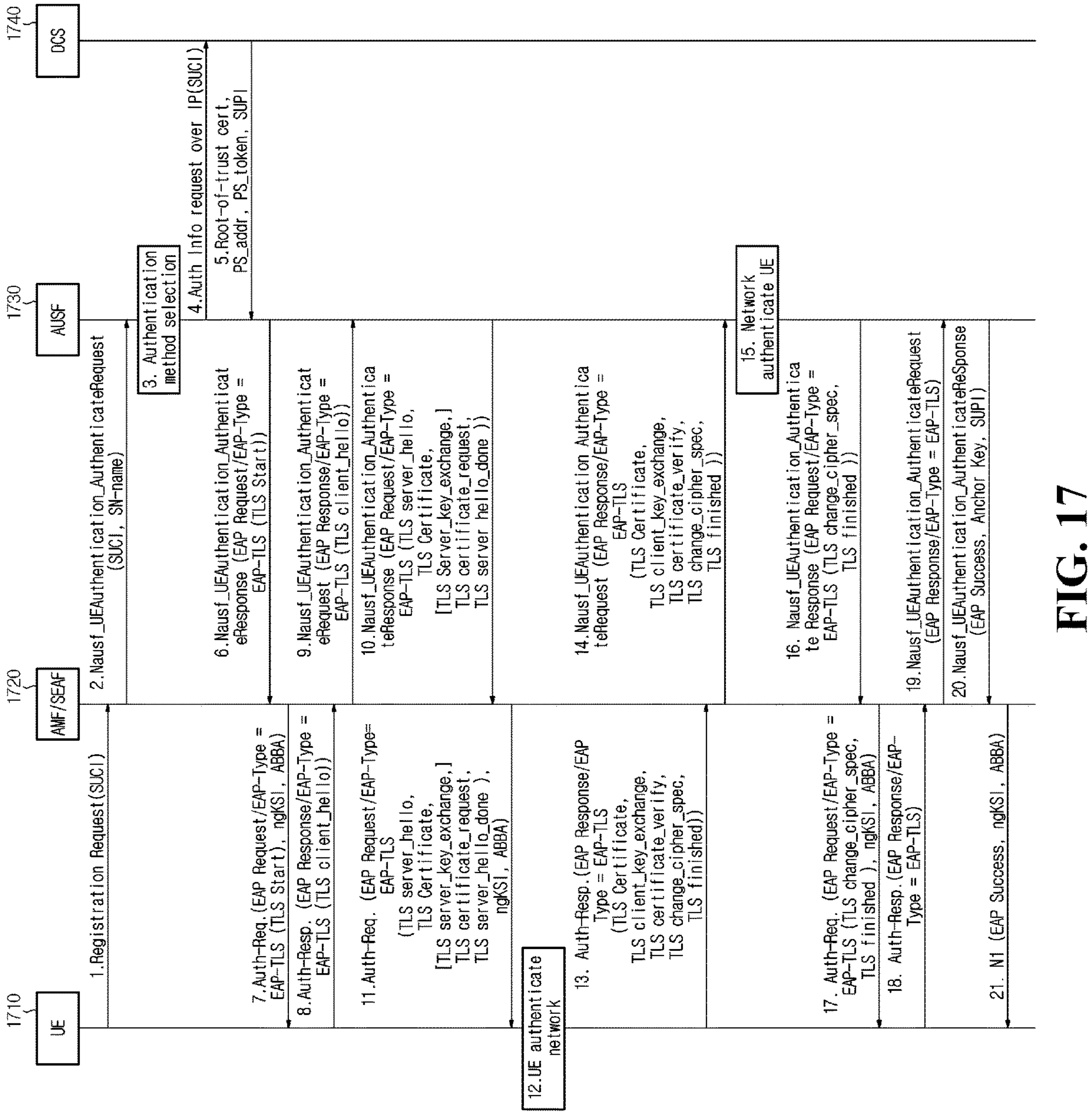
FIG. 17 is a view illustrating a method for performing authentication by a UE applied to the present disclosure.

FIG. 17 is a view illustrating a method for performing authentication by a UE applied to the present disclosure. Referring to FIG. 17, as described above, a UE 1710 may hold a default credential beforehand. As an example, the terminal 1710 may be provided with at least any one or more of a unique identifier identifiable in a manufacturer server, a UE certificate issued by a manufacturer, a public key of a manufacturer authentication server, and root/intermediary CA certificates capable of verifying a certificate of an onboarding network, but is not limited to the above-described embodiment. Herein, the UE 1710 may generate a subscription concealed identifier (SUCI) by encrypting the unique identifier with the public key of the manufacturer server. Then, the UE 1710 may transmit a registration request including the SUCI and an ID of an SNPN, which the UE wants to access, to an AMF/SEAF 1720 of the O-SNPN.

Herein, the AMF/SEAF 1720 may transmit an authentication request (e.g., Nausf_UEAuthentication_AuthenticateRequest) including the SUCI and the SNPN ID to the AUSF 1730. As an example, an authentication request may include SUCI and a serving network name (SN-name). In addition, the AMF/SEAF 1720 may further deliver indication information for helping the AUSF 1730 with selecting an authentication method, which is not limited to a specific embodiment.

Then, the AUSF 1730 may select an authentication method based on a domain part of SUCI and the above-described authentication method selection indication information. That is, the AUSF 1730 may select an authentication method based on a domain part of the received SUCI and an indication delivered from the AMF 1720. Herein, as an example, the AUSF 1730 may determine whether or not to perform mutual authentication with the DCS 1740 based on the UE 1710 and the EAP-TLS protocol.

Herein, the AUSF 1730 may search for the DCS 1740 through the domain part of the SUCI and request necessary information for authentication to the UE 1710. That is, the AUSF 1730 may transmit an authentication information request message to the DCS 1740. Herein, the authentication information request message may include the SUCI and may be delivered to the DCS 1740 through an IP.

Herein, the DCS 1740 may decrypte the SUCI encrypted with a public key through a private key and generate the SUCI. In addition, the DCS 1740 may respond to a network with root and intermediary CA certificates capable of verifying a certificate mapped to the SUPI and provisioning server address and PS token information in charge of authenticating the SNPN based on the received SNPN ID.

That is, based on a request of the AUSF 1730, the DCS 1740 may deliver a response including root-of-trust certificates, a PS address, a PS token and an SUPI to the AUSF 1730. Then, the AUSF 1730 may deliver an authentication response (e.g., Nausf_UE Authentication_AuthenticateResponse) to the AMF/SEAF 1720.

Then, two-way mutual authentication may be performed based on at least any one of a UE certificate that the UE 1710 is holding, root/intermediary CA certificates of an onboarding network, an onboarding network certificate that the onboarding network is holding, and root/intermediary CA certificates of the UE received from a PS.

As an example, for two-way authentication, the AMF/SEAF 1720 may transmit an authentication request message to the UE 1710 based on an EAP-TLS. Herein, the UE 1710 may deliver an authentication response message to the AMF/SEAF 1720 based on the EAP-TLS. Then, the AMF/SEAF 1720 may deliver an authentication request based on the EAP-TLS (e.g., Nausf_UEAuthentication_AuthenticateRequest) from the UE to the AUSF 1730. Herein, the AUSF 1730 may perform UE authentication and deliver an authentication response (e.g., Nausf_UEAuthentication_AuthenticateResponse) to the AMF/SEAF 1720. Thus, the UE may authenticate the network.

Then, the AMF/SEAF 1720 may deliver an authentication request to the UE 1710 and receive an authentication response from the UE 1710. Herein, the AMF/SEAF 1720 may deliver the authentication request (e.g., Nausf_UEAuthentication_AuthenticateRequest) to the AUSF 1730, and the AUSF 1740 may deliver the authentication response (e.g., Nausf_UEAuthentication_AuthenticateResponse) to the AMF/SEAF 1730. Herein, the network may also authentication the UE. That is, based on what is described above, two-way authentication may be performed. Then, the AMF/SEAF 1730 may exchange an authentication request/response message with the UE 1710 and exchange an authentication request/response message with the AUSF 1740, thereby completing two-way authentication. Then, the AUSF 1740 may deliver PS address information and PS token information to the UE, and the UE 1710 may obtain a credential of an SNPN, which the UE 1710 wants to access, from a PS, which is the same as described in FIG. 16.

That is, based on what is described above, a UE and an AUSF may perform two-way authentication. As an example, in FIG. 14, a proxy is needed in consideration of an existing AAA protocol and 5G authentication signaling, or a DCS needs to recognize a 5GS and support an AUSF and a UDM function. On the other hand, as described above, in FIG. 16 and FIG. 17, even if an AUSF supports no proxy function or a DCS does not recognize a 5GS and support an AUSF and a UDM function, authentication information may be requested through an IP and thus authentication may be performed.

That is, as described above, in case a UE and an AUSF perform two-way authentication, whether a proxy is supported or whether a DCS supports AUSF/UDM function may not be considered, so that the burden on the DCS may be reduced. In addition, as two-way authentication between a UE and an AUSF is performed, it may be better security than one-way authentication.

Figure 18:
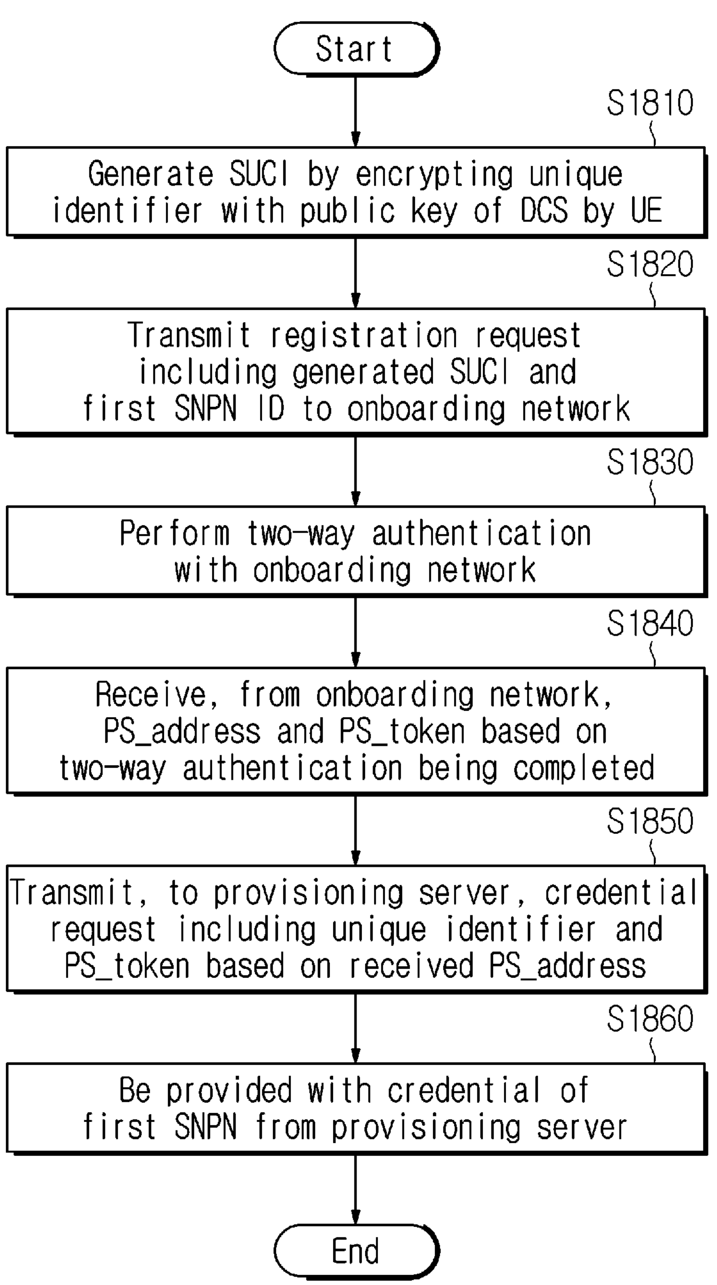
FIG. 18 is a view illustrating a method for operating a UE applied to the present disclosure.

FIG. 18 is a view illustrating a method for operating a UE applied to the present disclosure.

Referring to FIG. 18, a UE may generate an SUCI by encrypting a unique identifier with a public key of a DCS (S1810). Herein, as an example, the UE may obtain beforehand at least any one of a unique identifier identifiable in the DCS, a UE certificate issued based on the DCS, and root/intermediary CA certificates capable of verifying the public key of the DCS and a certificate of an onboarding network, and this is the same as described above. As an example, the UE may be provided with the above-described information from a manufacturer during a manufacturing process.

Next, the UE may transmit a registration request including the generated SUCI and a first SNPN ID to the onboarding network (S1820). Herein, the first SNPN may be an SNPN which the UE wants to access. Then, an AMF of the onboarding network may request authentication to an AUSF by including the SUCI and the first SNPN ID. Herein, as an example, the AMF may further provide the AUSF with indication information to help the AUSF with selecting an authentication method. As an example, the AUSF may select an authentication method through at least any one of a domain part of the SUCI and the above-described indication information for helping with selecting an authentication method. Herein, the AUSF may search for a DCS based on the domain part of the SUCI of the UE and request information necessary for UE authentication. That is, the AUSF may transmit an authentication information request message to the DCS. Herein, the authentication information request message may include at least any one or more of the SUCI and the first SNPN ID information. Then, the DCS may decrypt the SUCI received from the AUSF through a private key and generate an SUPI. Herein, the private key of the DCS may be a key paired with the public key, which the UE uses to generate the SUCI, and thus the DCS may decrypt the SUCI and generate the SUPI. In addition, the DCS may generate root/intermediary CA certificates capable of verifying a certificate mapped to the SUPI, an address of a provisioning server (PS_address) in charge of authenticating a first SNPN based on the received first SNPN ID, and PS_token that the PS will use for UE authentication later, and may respond to the onboarding network therewith.

Next, the UE may perform two-way authentication with the onboarding network (S1830). Herein, the two-way authentication may be performed based on at least any one of a UE certificate that the UE is holding, a root/intermediary CA certificate of the onboarding network, an onboarding network certificate that the onboarding network is holding, and a root/intermediary CA certificate of the UE received from the PS.

Next, when the two-way authentication is completed, the UE may receive PS_address and PS_token from the onboarding network (S1840). The UE may transmit a credential request including the unique identifier and PS_token to the PS based on the received PS_address (S1850) and may be provided with a credential of a first SNPN from the PS (S1860). Thus, the UE may be dynamically provided with the credential of a first SNPN, which the UE wants to access, and thus access an SNPN.

Figure 19:
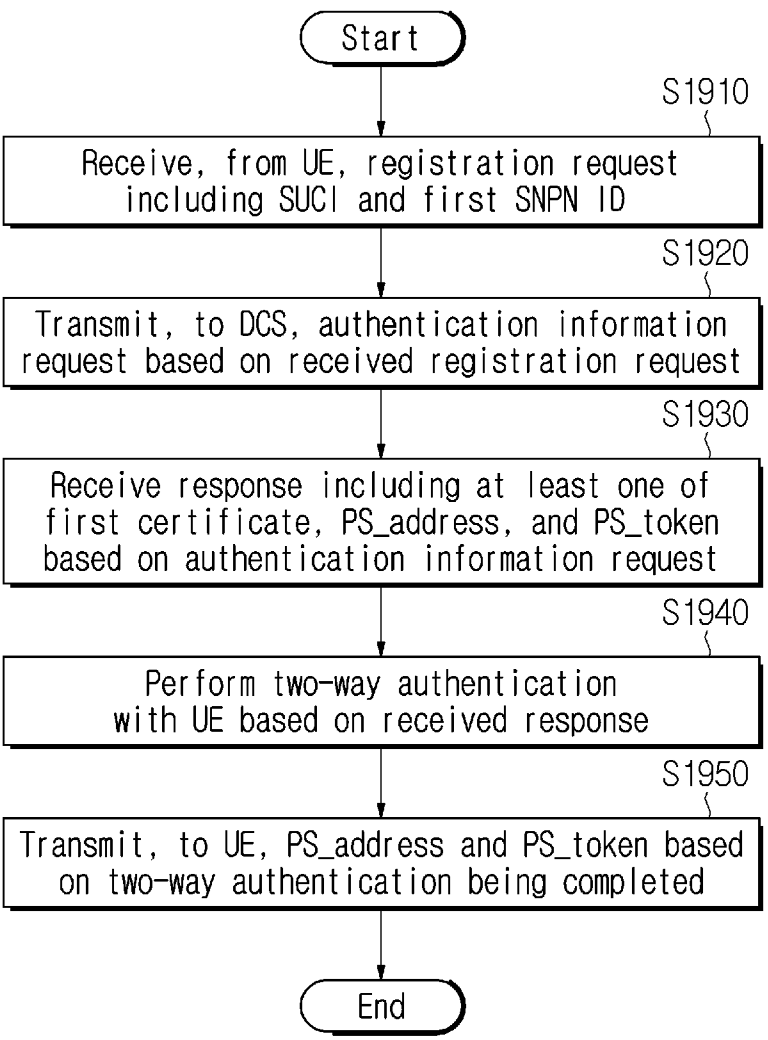
FIG. 19 is a view illustrating a method for operating a UE applied to the present disclosure.

FIG. 19 is a view illustrating a method for operating a UE applied to the present disclosure.

Referring to FIG. 19, an onboarding network may receive a registration request including an SUCI encrypted with a public key of a DCS and a first SNPN from a UE (S1910). Herein, as an example, the UE may obtain beforehand at least any one of a unique identifier identifiable in the DCS, a UE certificate issued based on the DCS, and root/intermediary CA certificates capable of verifying the public key of the DCS and a certificate of an onboarding network, and this is the same as described above. As an example, the UE may be provided with the above-described information from a manufacturer during a manufacturing process. Herein, the first SNPN may be an SNPN which the UE wants to access.

Next, the onboarding network may transmit an authentication information request to the DCS based on the received registration request (S1920). Specifically, an AMF of the onboarding network may request authentication to an AUSF by including the SUCI and the first SNPN ID. Herein, as an example, the AMF may further provide the AUSF with indication information to help the AUSF with selecting an authentication method. The AUSF may select an authentication method through at least any one of a domain part of the SUCI and the above-described indication information for helping with selecting an authentication method. Herein, the AUSF may search for a DCS based on the domain part of the SUCI of the UE and request information necessary for UE authentication. That is, the AUSF may transmit a message for the authentication information request to the DCS. Herein, the authentication information request message may include at least any one or more of the SUCI and the first SNPN ID information.

Next, the onboarding network may receive a response including at least any one of a first certificate, a PS_address, and a PS_token based on the authentication information request (S1930). Herein, the DCS may decrypt the SUCI received from the AUSF through a private key and generate an SUPI. The private key of the DCS may be a key paired with the public key, which the UE uses to generate the SUCI, and thus the DCS may decrypt the SUCI and generate the SUPI. In addition, the first certificate received from the DCS may be a certificate of a root/intermediary certificate authority (CA) capable of verifying a certificate mapped to the SUPI. In addition, the onboarding network may receive an address (PS_address) of a provisioning server (PS) in charge of authenticating a first SNPN based on the first SNPN ID and PS_token that the PS will use for UE authentication later, and this is the same as described above.

Next, the onboarding network may perform two-way authentication with the UE based on the received response (S1940). Herein, the two-way authentication may be performed based on at least any one of a UE certificate that the UE is holding, a root/intermediary CA certificate of the onboarding network, an onboarding network certificate that the onboarding network is holding, and a root/intermediary CA certificate of the UE received from the PS.

Next, when the two-way authentication is completed, the onboarding network may transmit PS_address and PS_token to the UE (S1950). The UE may transmit a credential request including the unique identifier and PS_token to the PS based on the received PS_address and may be provided with a credential of the first SNPN from the PS. Thus, the UE may be dynamically provided with the credential of a first SNPN, which the UE wants to access, and thus access an SNPN.

Since examples of the above-described proposed method may also be included as one of the implementation methods of the present disclosure, it is apparent that the examples may be regarded as a kind of proposed methods. In addition, the above-described proposed methods may be implemented independently, or some of the proposed methods may be combined (or merged) to be implemented. A rule may be defined such that the BS provides the information on whether the proposed methods are applied (or information on the rules of the proposed methods) to the UE through a predefined signal (e.g., a physical layer signal or a higher layer signal).

The present disclosure may be carried out in other specific forms than those set forth herein without departing from the technical idea and essential features of the present disclosure. The above detailed description is therefore to be construed in all aspects as illustrative and not restrictive. The scope of the disclosure should be determined by a reasonable interpretation of the appended claims, and all changes coming within the equivalent range of the present disclosure are intended to be embraced therein. In addition, claims not explicitly cited by each other in the appended claims may be combined to configure an embodiment of the present disclosure or included in a new claim by a subsequent amendment after the application is filed.

Embodiments of the present disclosure are applicable to various wireless access systems. Examples of the various wireless access systems include a 3rd Generation Partnership Project (3GPP) system or a 3GPP2 system.

Besides the various wireless access systems, the embodiments of the present disclosure are applicable to all technical fields in which the wireless access systems find their applications. Moreover, the proposed method is also applicable to mmWave THz communication systems using an ultra-high frequency band.

Additionally, the embodiments of the present disclosure are applicable to various applications such as a self-driving vehicle and a drone.

What is claimed is:

1. A method for operating a user equipment (UE) in a wireless communication system, the method comprising:

generating, by the UE, a subscription concealed identifier (SUCI);

transmitting, to a base station, a registration request;

performing two-way authentication with the base station;

receiving, from the base station, a provisioning server address and a provisioning server token based on the two-way authentication being completed;

transmitting, to a provisioning server, a credential request; and being provided with a credential of a first SNPN from the provisioning server, wherein the SUCI is generated by encrypting a unique identifier with a public key of a default credential server (DCS), wherein the registration request includes the generated SUCI and a first standalone non public network (SNPN) ID, and wherein the credential request includes the unique identifier and the provisioning server token based on the received provisioning server address.

2. The method of claim 1, wherein an access and mobility management function (AMF) of the base station receives the registration request from the UE, and wherein the AMF requests authentication including the SUCI and the first SNPN ID to an authentication server function (AUSF) of the base station.

3. The method of claim 2, wherein, based on the AMF requesting the authentication to the AUSF, the AMF further transmits, to the AUSF, authentication method selection indication information.

4. The method of claim 3, wherein the AUSF searches for the DCS by confirming the authentication method selection indication information and domain information of the SUCI and requests necessary information for the authentication of the UE to the DCS, generate a subscription concealed identifier (SUCI);

control the transceiver to transmit, to a base station, a registration request;

perform two-way authentication with the base station;

control the transceiver to receive, from the base station, a provisioning server address and a provisioning server token based on the two-way authentication being completed;

controlling the transceiver to transmit, to the provisioning server, a credential request; and controlling the transceiver to be provided with a credential of a first SNPN from the provisioning server, wherein the SUCI is generated by encrypting a unique identifier with a public key of a default credential server (DCS), wherein the registration request includes the generated SUCI and a first standalone non public network (SNPN) ID, and wherein the credential request includes the unique identifier and the provisioning server token based on the received provisioning server address.

5. The method of claim 4, wherein the necessary information for the authentication of the UE transmitted to the DCS includes the SUCI, wherein the DCS generates a subscriber identifier (SUPI) by decrypting the SUCI with a private key, generates a first certificate capable of verifying a certificate mapped to the SUPI, generates the provisioning server address of the provisioning server in charge of authenticating the first SNPN based on the first SNPN ID, and generates the provisioning server token that the provisioning server and the UE use for authentication.

6. The method of claim 5, wherein the AUSF receives, from the DCS, the first certificate, the provisioning server address of the provisioning server in charge of authenticating the first SNPN based on the first SNPN ID, and the provisioning server token that the provisioning server uses for the authentication of the UE.

7. The method of claim 1, wherein the UE is provided beforehand by the DCS with at least one of the unique identifier, the public key, a certificate of the UE issued based on the DCS, and a certificate of a root/intermediary certificate authority (CA) capable of verifying a certificate of thebase station.

8. The method of claim 1, wherein the two-way authentication is performed based on an extensible authentication protocol-transport layer security (EAP-TLS) protocol.

9. The method of claim 1, wherein the base station is an onboarding-standalone non-public network (O-SNPN).

10. The method of claim 1, wherein the UE accesses the first SNPN based on the credential of the first SNPN delivered from the provisioning server.

11. A user equipment (UE) operating in a wireless communication system, the UE comprising:

a transceiver; and a processor coupled to the transceiver, wherein the processor is configured to:

server address and is provided with a credential of a first SNPN from the provisioning server, and wherein the registration request includes a generated subscription concealed identifier (SUCI) and a first standalone non public network (SNPN) ID.

12. An base station operating in a wireless communication system, the base station comprising:

a transceiver; and a processor coupled to the transceiver, wherein the processor is configured to:

control the transceiver to receive, from a user equipment (UE), a registration request;

control the transceiver to transmit, to a DCS, an authentication information request based on the received registration request;

control the transceiver to receive, based on the authentication information request, a response including at least one of a first certificate, an address of a provisioning server, and a provisioning server token;

perform two-way authentication with the UE based on the received response; and control the transceiver to transmitting the provisioning server address and the provisioning server token to the UE based on the two-way authentication being completed, wherein the UE transmits, to the provisioning server, a credential request including the unique identifier and the provisioning server token based on the received provisioning.

* * * * *